(12) United States Patent
Geirhofer et al.

(10) Patent No.: US 9,681,425 B2
(45) Date of Patent: Jun. 13, 2017

(54) RANK-SPECIFIC FEEDBACK FOR IMPROVED MIMO SUPPORT

(71) Applicant: QUALCOMM Incorporated, San Diego, CA (US)

(72) Inventors: Stefan Geirhofer, San Diego, CA (US); Wanshi Chen, San Deigo, CA (US); Peter Gaal, San Diego, CA (US); Yongbin Wei, San Diego, CA (US); Naga Bhushan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 13 days.

(21) Appl. No.: 13/887,168

(22) Filed: May 3, 2013

(65) Prior Publication Data

US 2013/0301560 A1 Nov. 14, 2013

Related U.S. Application Data

(60) Provisional application No. 61/646,203, filed on May 11, 2012, provisional application No. 61/692,664, filed on Aug. 23, 2012.

(51) Int. Cl.
*H04W 4/00* (2009.01)
*H04W 72/04* (2009.01)
(Continued)

(52) U.S. Cl.
CPC ...... *H04W 72/0413* (2013.01); *H04B 7/0417* (2013.01); *H04B 7/0621* (2013.01); *H04B 7/0632* (2013.01); *H04B 7/0639* (2013.01)

(58) Field of Classification Search
CPC ...... H04L 5/0048; H04B 7/024; H04B 7/0626
(Continued)

(56) References Cited

U.S. PATENT DOCUMENTS 8,681,627 B2 * 3/2014 Choudhury ........... H04W 24/10
370/235
2008/0170523 A1 * 7/2008 Han ..................... H04B 7/0413
370/310
(Continued)

FOREIGN PATENT DOCUMENTS

CN 102201897 A 9/2011
CN 102255689 A 11/2011
(Continued)

OTHER PUBLICATIONS

International Search Report and Written Opinion—PCT/US2013/039739—ISA/EPO—Dec. 2, 2013.
(Continued)

*Primary Examiner* — Khaled Kassim
*Assistant Examiner* — Berhanu Belete
(74) *Attorney, Agent, or Firm* — Arent Fox LLP

(57) ABSTRACT

A method, an apparatus, and a computer program product for wireless communication are provided in which downlink transmission modes in a wireless network are semi-statically configured for a mobile terminal in multiple-input multiple-output (MIMO) operation. The apparatus provides multiple precoding matrix indicators (PMIs) for a plurality of ranks. The provision of multiple PMIs by the apparatus enables balanced performance among different ranks and avoids less than optimal performance observed when the apparatus provides only a single rank and PMI that are generally not optimal for all transmissions. Feedback configuration information received by an apparatus defines a plurality of channel state information feedback instances conditioned on an admissible rank value. Rank indicators (RIs) and PMIs corresponding to the feedback instances are determined and feedback is provided for the channel state information feedback instances.

53 Claims, 14 Drawing Sheets

(51) Int. Cl.
*H04B 7/0417* (2017.01)
*H04B 7/06* (2006.01)

(58) Field of Classification Search
USPC .................................................. 370/328–331
See application file for complete search history.

(56) References Cited

U.S. PATENT DOCUMENTS

| | | | |
|---|---|---|---|
| 2009/0059844 A1* | 3/2009 | Ko | H04B 7/0413 370/328 |
| 2009/0181691 A1* | 7/2009 | Kotecha | H04B 7/0417 455/452.1 |
| 2009/0207799 A1* | 8/2009 | Mazzarese | H04W 24/10 370/329 |
| 2010/0002598 A1* | 1/2010 | Pan | H04B 7/063 370/252 |
| 2010/0067616 A1* | 3/2010 | Chun | H04B 7/063 375/295 |
| 2010/0238824 A1* | 9/2010 | Farajidana | H04B 7/0417 370/252 |
| 2011/0032839 A1* | 2/2011 | Chen et al. | 370/252 |
| 2011/0141987 A1* | 6/2011 | Nam | H04L 1/0003 370/329 |
| 2011/0243079 A1* | 10/2011 | Chen | H04B 7/063 370/329 |
| 2011/0244877 A1* | 10/2011 | Farajidana | H04L 5/0023 455/452.2 |
| 2011/0269490 A1* | 11/2011 | Earnshaw | H04L 1/0026 455/509 |
| 2011/0305161 A1 | 12/2011 | Ekpenyong et al. | |
| 2012/0039282 A1* | 2/2012 | Kim | H04W 52/54 370/329 |
| 2012/0051257 A1 | 3/2012 | Kim et al. | |
| 2012/0076024 A1 | 3/2012 | Ko et al. | |
| 2012/0082248 A1* | 4/2012 | Han et al. | 375/259 |
| 2012/0127869 A1* | 5/2012 | Yin | H04L 1/0031 370/252 |
| 2012/0176996 A1 | 7/2012 | Kim et al. | |
| 2012/0250550 A1* | 10/2012 | Gomadam | H04B 7/0623 370/252 |
| 2012/0270535 A1 | 10/2012 | Chen et al. | |
| 2012/0281556 A1 | 11/2012 | Sayana et al. | |
| 2012/0287799 A1* | 11/2012 | Chen | H04B 7/024 370/252 |
| 2012/0320783 A1* | 12/2012 | Wu et al. | 370/252 |
| 2012/0320862 A1 | 12/2012 | Ko et al. | |
| 2012/0327882 A1* | 12/2012 | Park | H04B 7/0632 370/329 |
| 2012/0328035 A1 | 12/2012 | Yoon et al. | |
| 2013/0021926 A1* | 1/2013 | Geirhofer et al. | 370/252 |
| 2013/0028109 A1* | 1/2013 | Jongren | H04W 16/32 370/252 |
| 2013/0033998 A1* | 2/2013 | Seo | H04W 24/00 370/252 |
| 2013/0121301 A1* | 5/2013 | Kim et al. | 370/329 |
| 2013/0121312 A1* | 5/2013 | Roman | H04B 7/0486 370/335 |
| 2013/0194940 A1* | 8/2013 | Li | H04J 11/0023 370/252 |
| 2013/0258874 A1* | 10/2013 | Khoshnevis et al. | 370/252 |
| 2013/0279350 A1* | 10/2013 | Erickson | H04W 24/08 370/252 |
| 2013/0336269 A1* | 12/2013 | Davydov | H04W 4/06 370/329 |

FOREIGN PATENT DOCUMENTS

| | | | | |
|---|---|---|---|---|
| JP | 2010273345 A | 12/2010 | | |
| KR | 101060857 B1 | 8/2011 | | |
| KR | WO 2011108898 A2 * | 9/2011 | | H04B 7/0619 |
| KR | 20120033249 A | 4/2012 | | |
| KR | 20120047759 A | 5/2012 | | |
| WO | 2011121499 A2 | 10/2011 | | |
| WO | 2011130393 A1 | 10/2011 | | |
| WO | 2012060550 A2 | 5/2012 | | |

OTHER PUBLICATIONS

Partial International Search Report—PCT/US2013/039739—ISA/EPO—Aug. 5, 2013.

Texas Instruments: "Dynamic SU/MU Switching with Multi-Rank PMI/CQI Feedback", 3GPP TSG-RAN WG1#59bis, R1-100454, Jan. 22, 2010, 5 Pages.

* cited by examiner

RANK-SPECIFIC FEEDBACK FOR IMPROVED MIMO SUPPORT

CROSS-REFERENCE TO RELATED APPLICATION(S)

This application claims the benefit of U.S. Provisional Application Ser. No. 61/646,203 entitled "RANK-SPECIFIC FEEDBACK FOR IMPROVED MIMO SUPPORT" and filed on May 11, 2012, and U.S. Provisional Application Ser. No. 61/692,664 entitled "RANK-SPECIFIC FEEDBACK FOR IMPROVED MIMO SUPPORT" and filed on Aug. 23, 2012, which are expressly incorporated by reference herein in their entireties.

BACKGROUND

Field

The present disclosure relates generally to communication systems, and more particularly, to a wireless communications networks that support terminals with multiple antennae.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of a modern telecommunication standard is Long Term Evolution (LTE). LTE is a set of enhancements to the Universal Mobile Telecommunications System (UMTS) mobile standard promulgated by Third Generation Partnership Project (3GPP). It improves support for mobile broadband Internet access by improving spectral efficiency, reduces costs, improves services, makes use of new spectrum, and integrates with other open standards using OFDMA on the downlink (DL), SC-FDMA on the uplink (UL), and multiple-input multiple-output (MIMO) antenna technology. However, as the demand for mobile broadband access increase, there exists a need to advance LTE technology. Preferably, these improvements should be applicable to other multi-access technologies and the telecommunication standards that employ these technologies.

SUMMARY

In an LTE network, a UE operates in single user MIMO (SU-MIMO) mode or multi-user MIMO (MU-MIMO) mode and the UE may dynamically switch between SU-MIMO and MU-MIMO based on a determination of base station scheduling. However, the UE only provides a single precoding matrix indicator (PMI) which is not optimal or balanced for all possible ranks Various aspects of the disclosure relate to providing multiple PMIs for a plurality of ranks or a single PMI that is balanced among different ranks. The provision of multiple PMIs or a balanced PMI by the terminal enables improved performance over multiple ranks as compared to when the UE provides only a single PMI based on a single rank.

In an aspect of the disclosure, a UE can be configured to use a precoding matrix indicator (PMI) for the UE channel state information feedback. The PMI may comprise a signal fed back by the UE and related to MIMO operation. The PMI may correspond to the index of a precoder within a codebook shared by the UE and a base station. PMI may be associated with a rank indicator (RI) that is signaled to the base station by the UE and which corresponds to the number of useful transmission layers for spatial multiplexing. The type of PMI supported may depend on the type of channel state information feedback. The UE may report a PMI that targets a balanced performance among different ranks, and enables multiple rank reports while reducing the need for tradeoffs in PMI selection.

In an aspect of the disclosure, feedback configuration information is received by a UE that defines a plurality of channel state information (CSI) feedback instances. Each CSI feedback instance is conditioned on one of a set of admissible rank values.

In an aspect of the disclosure, a RI and a PMI corresponding to each of the CSI instances are determined.

In an aspect of the disclosure, CSI feedback is provided for one or more of the CSI feedback instances. The CSI feedback may comprise the RI and the PMI corresponding to each of the CSI instances.

In an aspect of the disclosure, a channel quality indicator (CQI) corresponding to each of the CSI instances is determined. The CSI feedback comprises the CQI corresponding to each of the CSI instances. The PMI may be determined with a frequency granularity for the one or more CSI feedback instances. The frequency granularity may be determined based on a rank selected for the one or more CSI feedback instances.

In an aspect of the disclosure, receiving the feedback configuration information comprises receiving a bitmap specifying rank values that are admissible for each CSI feedback instance, and conditioning each CSI feedback instance by the set of admissible rank values by determining RI among the rank values that are specified to be admissible in the bitmap. Receiving the feedback configuration information may comprise receiving a bitmap specifying combinations of RI and PMI that are admissible for each CSI feedback instance, wherein the RI and PMI is determined for combinations which are specified as admissible in the bitmap.

In an aspect of the disclosure, signaling may be received that associates each of one or more sets of subframes with one or more rank values, and a set of admissible rank values for each CSI instance may be determined based on the one or more rank values associated with the subframe set which includes a reference subframe. The feedback configuration information may identify the rank used for reporting the CSI feedback. The feedback configuration information may identify a plurality of ranks for which RI and PMI are reported in the CSI feedback through additional bits in a DCI format requesting an aperiodic feedback report. The feedback information may identify the set of admissible rank values through RRC-based configuration.

In an aspect of the disclosure, CSI feedback for the one or more ranks may be provided by determining a set of subbands from a plurality of subbands, providing a first CSI feedback report corresponding to the set of subbands, and providing a second CSI feedback report corresponding to the plurality of subbands.

In an aspect of the disclosure, the RI and the PMI corresponding to each of the CSI instances may be determined based on channel measurements on a channel measurement resource and interference measurements on an interference measurement resource. The feedback configuration information disables one or more PMIs in a codebook for each CSI feedback instance.

In an aspect of the disclosure, a method, apparatus, and computer-readable medium for wireless communication are provided. The apparatus receives feedback configuration information that associates a plurality of admissible rank value sets to channel state information (CSI) feedback process sets. Each admissible rank value set includes at least one rank indicator (RI) and precoding matrix indicator (PMI) pair (RI-PMI pair). Each CSI feedback process set includes at least one CSI feedback process, and each CSI feedback process is based on an admissible rank value set from the plurality of admissible rank value sets. The apparatus determines a selected admissible rank value set based on the plurality of admissible rank value sets, wherein the apparatus bases the selection on signaling from a base station. The apparatus determines at least one RI-PMI pair corresponding to the selected admissible rank value set, determines at least one channel quality indicator (CQI), each CQI corresponding to one of the at least one RI-PMI pair, and transmits a CSI report including the at least one RI-PMI pair and the at least one CQI to the base station.

In another aspect of the disclosure, the apparatus receives feedback configuration signaling that defines at least a first channel state information (CSI) process and a second CSI process, wherein the first CSI process is designated as a reference CSI process for the second CSI process. The apparatus determines at least one of a rank indicator (RI) or a subband selection for the first CSI process based on measurements associated with the first CSI process, determines CSI information for the second CSI process based on the RI and/or subband selection determined for the first CSI process, and transmits the CSI information for at least one of the first CSI process or the second CSI process.

DETAILED DESCRIPTION

Figure 1:
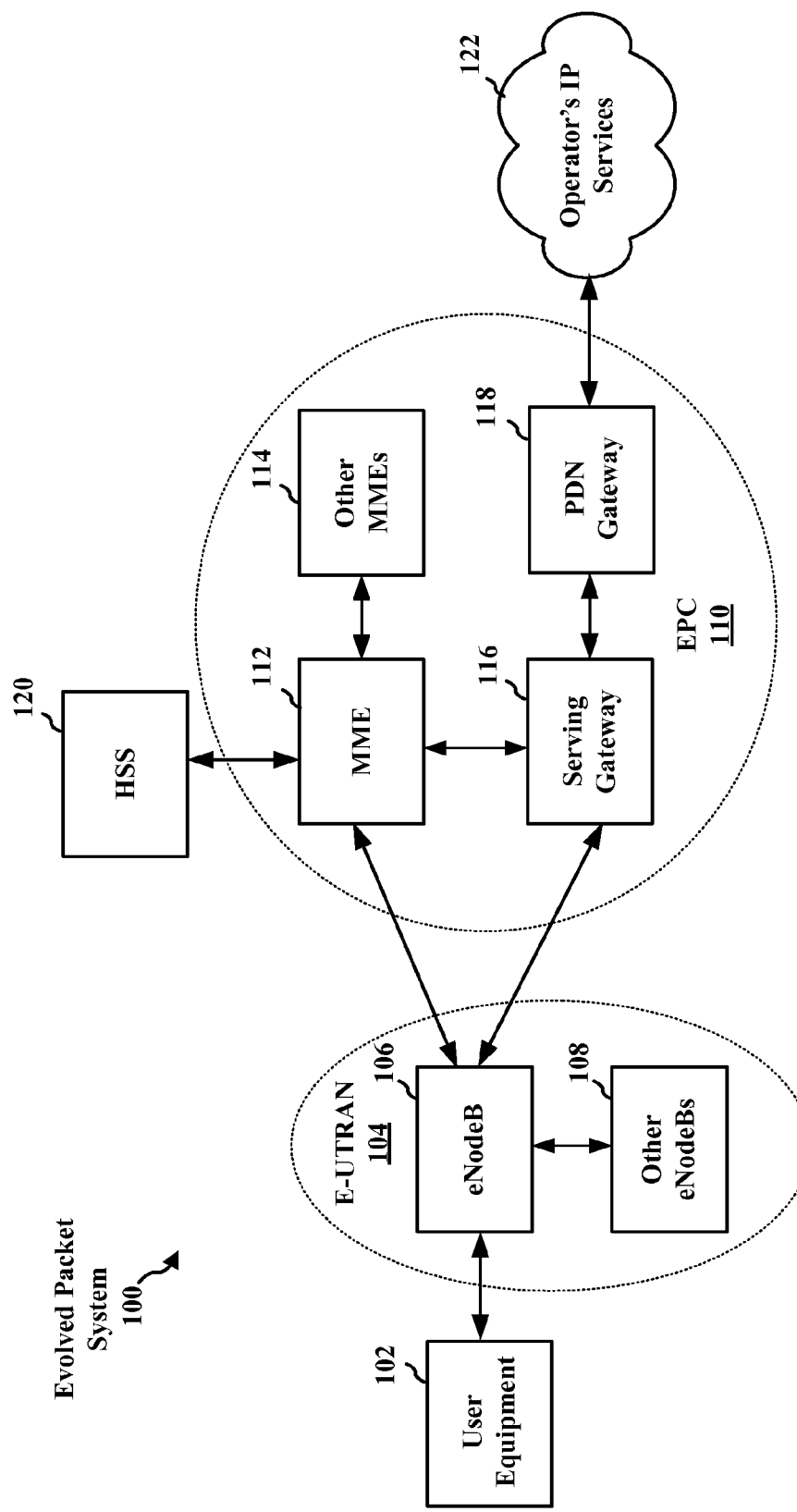
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Combinations of the above should also be included within the scope of computer-readable media.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's IP Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108. The eNB 106 provides user and control planes protocol terminations toward the UE 102. The eNB 106 may be connected to the other eNBs 108 via a backhaul (e.g., an X2 interface). The eNB 106 may also be referred to as a base station, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected by an S1 interface to the EPC 110. The EPC 110 includes a Mobility Management Entity (MME) 112, other MMEs 114, a Serving Gateway 116, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include the Internet, an Intranet, an IP Multimedia Subsystem (IMS), and a PS Streaming Service (PSS).

Figure 2:
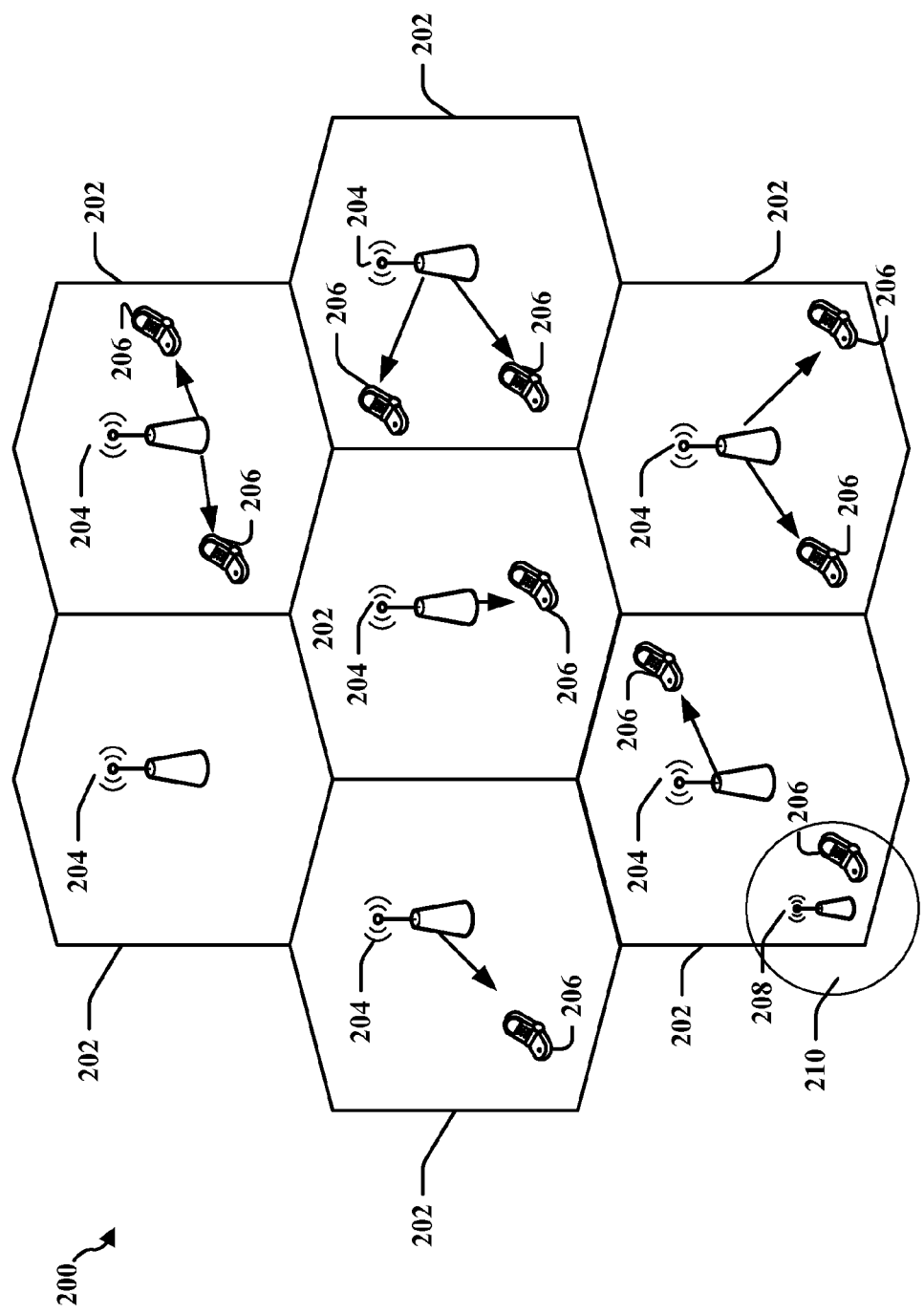
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116.

The modulation and multiple access scheme employed by the access network 200 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data steams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
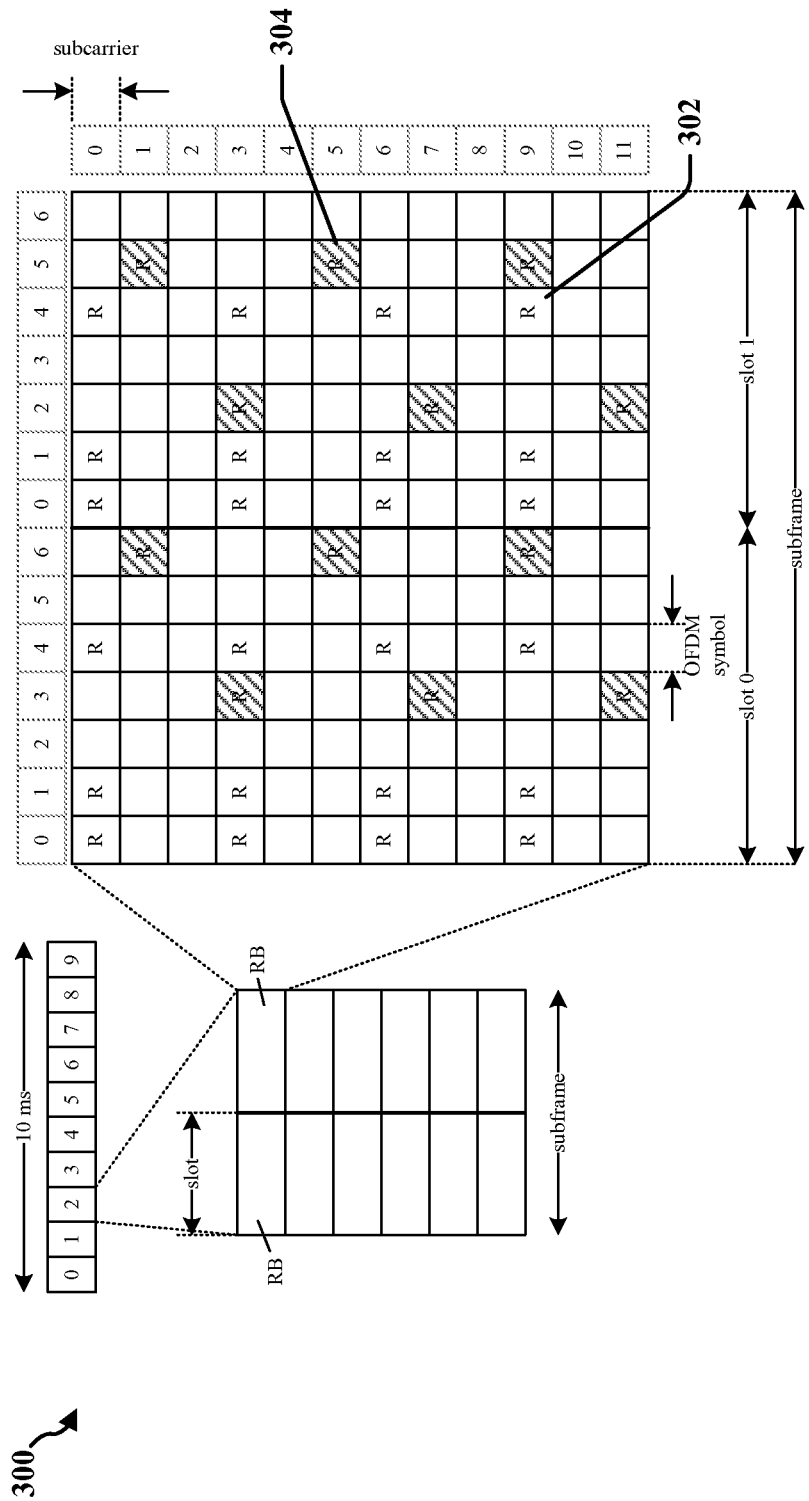
FIG. 3 is a diagram illustrating an example of a DL frame structure in LTE.

FIG. 3 is a diagram 300 illustrating an example of a DL frame structure in LTE. A frame (10 ms) may be divided into 10 equally sized sub-frames. Each sub-frame may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, as indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 4:
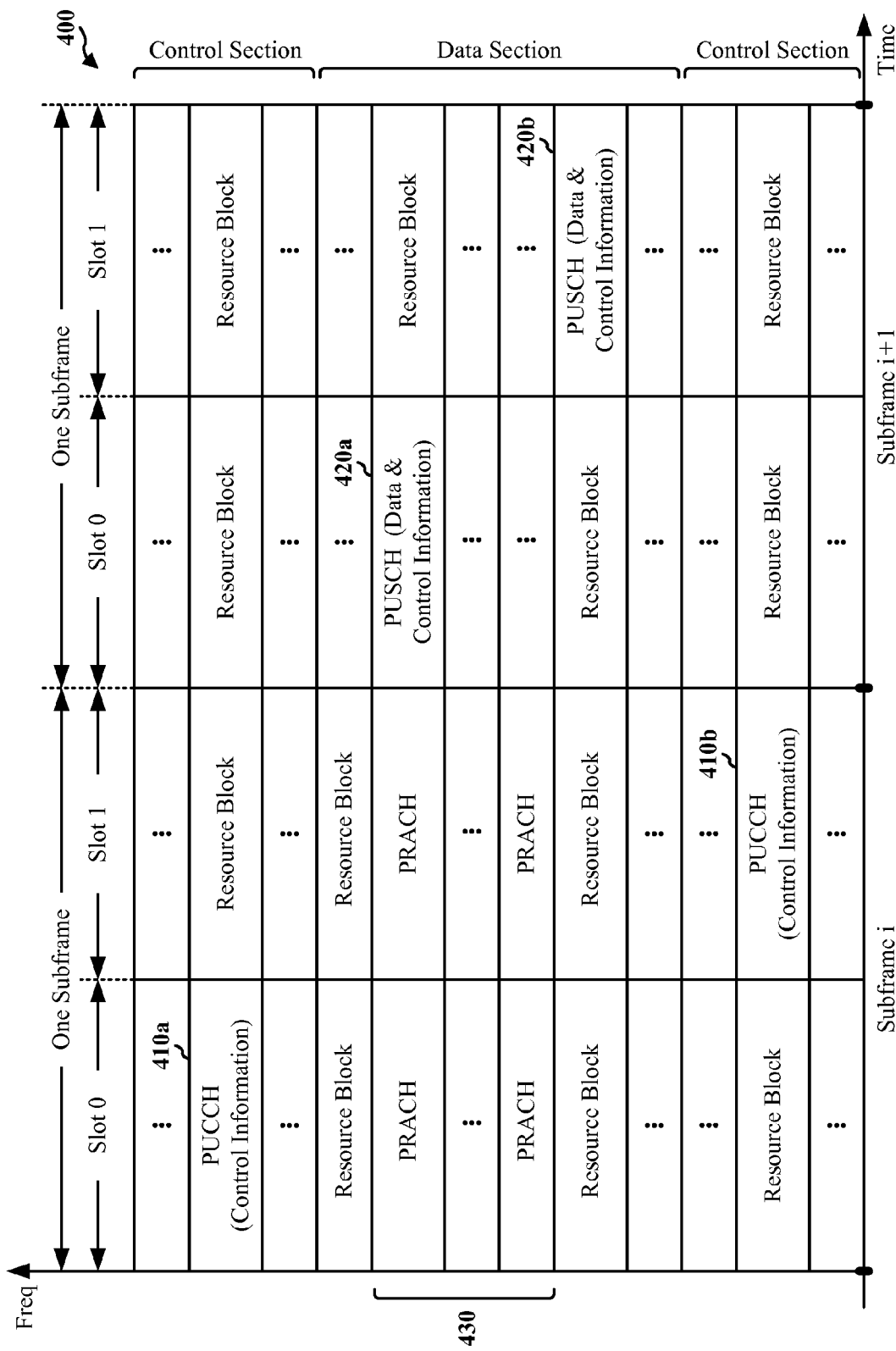
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a sub-frame and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
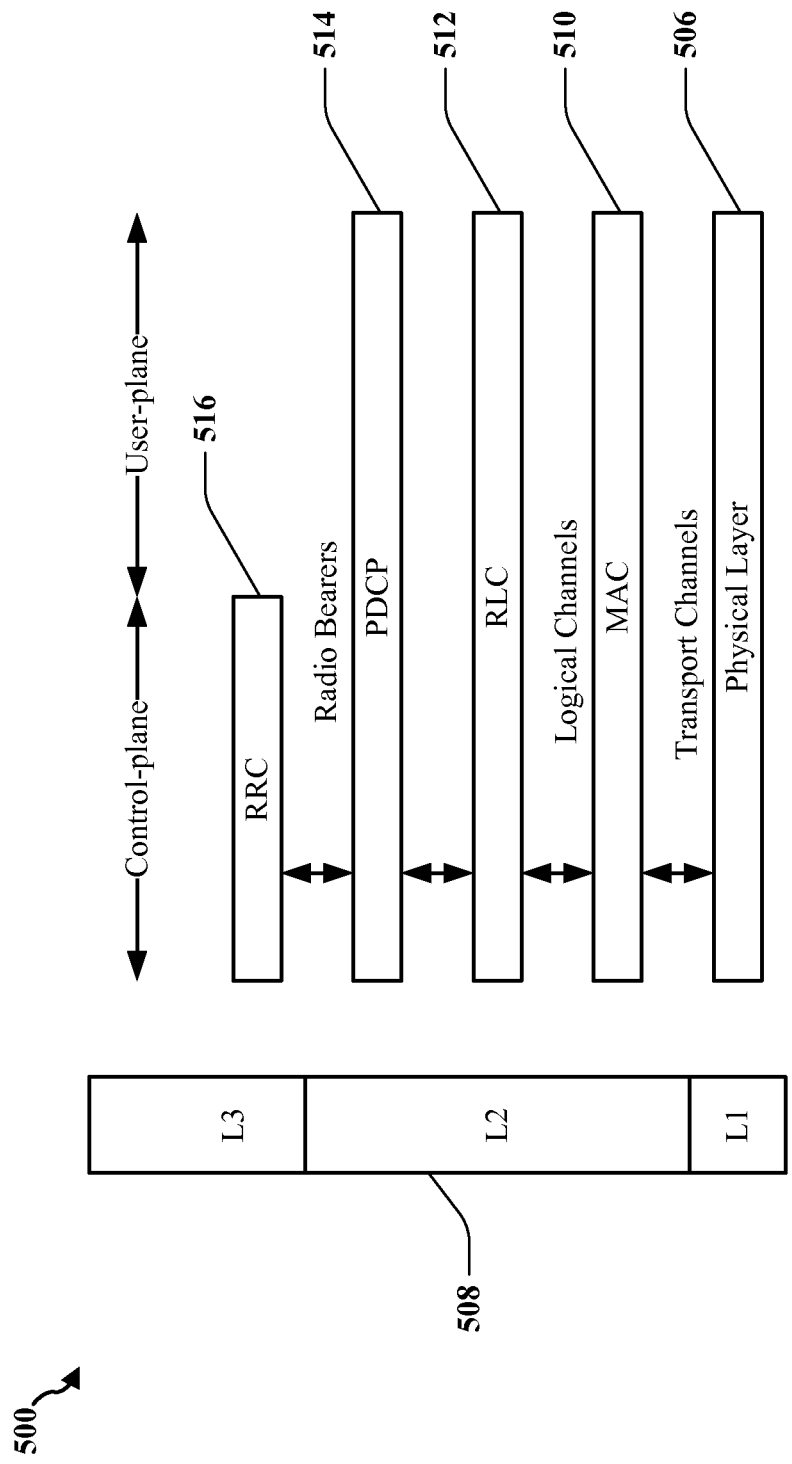
FIG. 5 is a diagram illustrating an example of a radio protocol architecture for the user and control planes.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARM). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the eNB and the UE.

Figure 6:
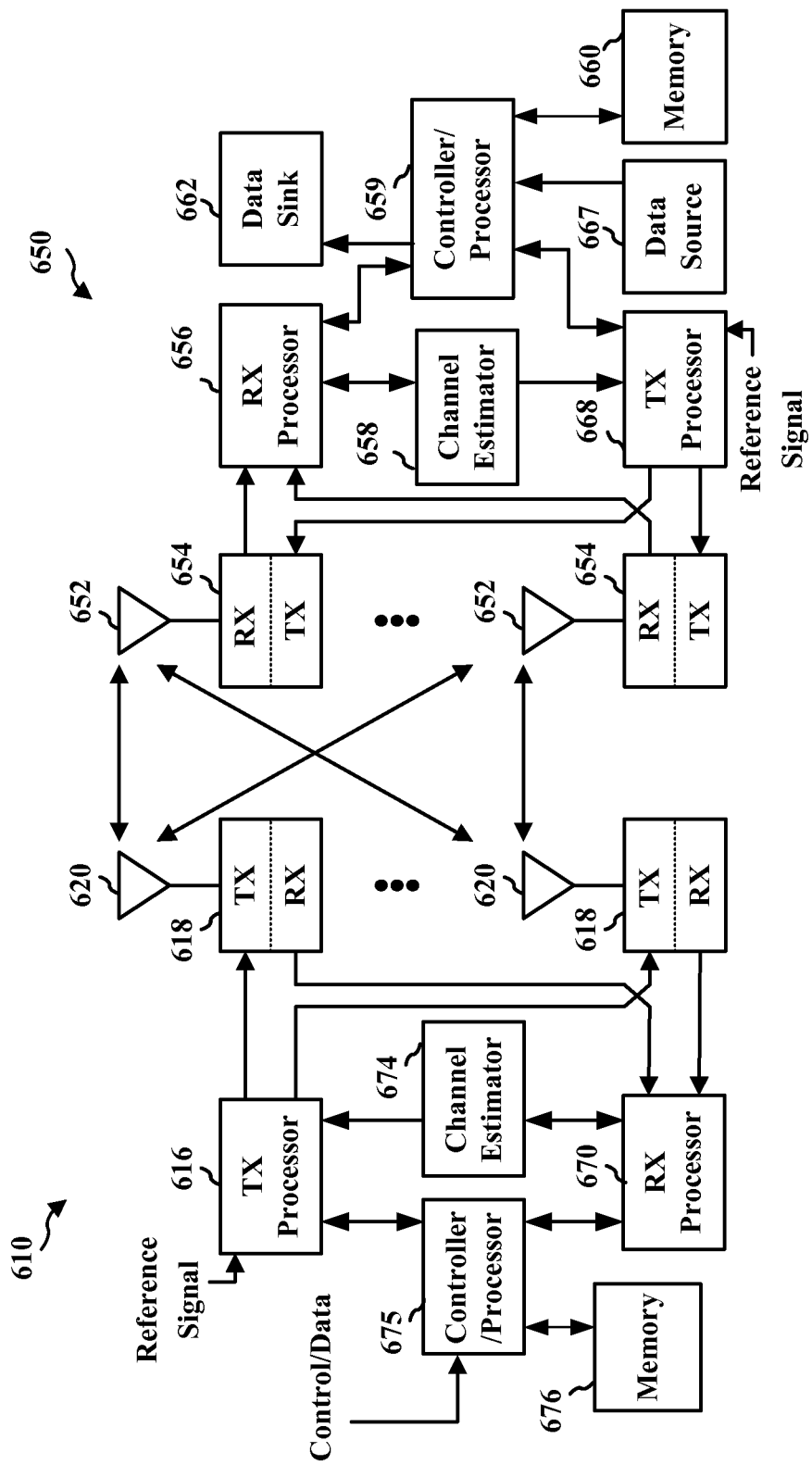
FIG. 6 is a diagram illustrating an example of an evolved Node B and user equipment in an access network.

FIG. 6 is a block diagram of an eNB 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions includes coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission.

At the UE 650, each receiver 654RX receives a signal through its respective antenna 652. Each receiver 654RX recovers information modulated onto an RF carrier and provides the information to the receive (RX) processor 656. The RX processor 656 implements various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 are provided to different antenna 652 via separate transmitters 654TX. Each transmitter 654TX modulates an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the control/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

Figure 7:
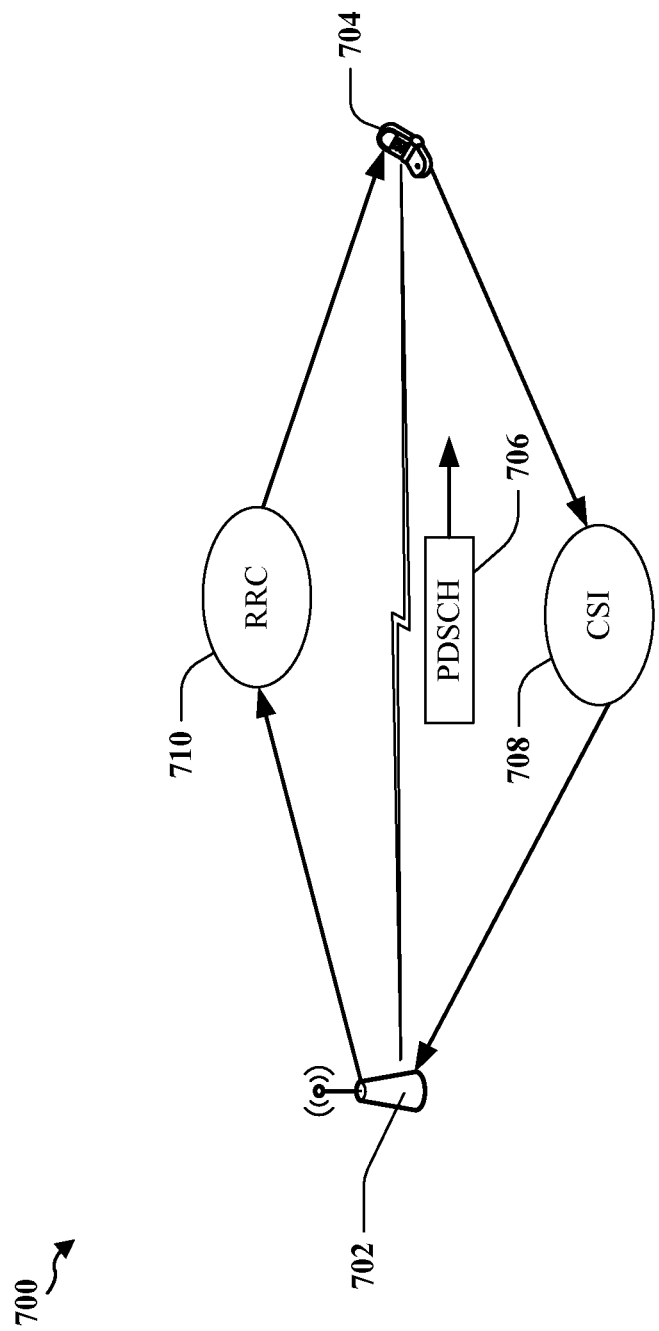
FIG. 7 is a simplified diagram illustrating a wireless network.

FIG. 7 is a simplified schematic of a wireless network, which may comprise an LTE network. In an LTE network, downlink transmission modes may be semi-statically configured for a UE 704. The transmission of PDSCH 706 may include a UE-specific reference signal, such as DM-RS. For MIMO, eNB 702 scheduling may determine whether UE 704 operates in single user MIMO (SU-MIMO) mode or whether it is co-scheduled with another UE in multi-user MIMO (MU-MIMO) operation. UE 702 may be dynamically switched between SU-MIMO and MU-MIMO based on scheduling requirements determined by eNB 702.

UE 704 can be configured to use a PMI for UE 704 channel state information feedback. The PMI typically comprises a signal fed back by the UE 704 to the eNB 702, which is related to the current MIMO operation/mode and corresponds to the index of the precoder within a codebook shared by the UE 704 and eNB 702. The precoder index is typically selected to maximize the aggregate number of data bits which could be received across all downlink spatial transmission layers. PMI is associated with a RI that is signaled to the eNB 702 by the UE 704 and corresponds to the number of usable transmission layers the UE determines can be used for spatial multiplexing (based on an estimate of the downlink channel determined by the UE 704). The RI enables the eNB 702 to adapt PDSCH transmissions 706 based on the UE 704 channel estimate.

The type of PMI supported may depend on the type of channel state information (CSI) feedback 708. For example, CSI feedback 708 may be reported periodically for wideband single PMI mode and/or for a UE-selected single PMI mode. In another example, CSI feedback 708 may be reported aperiodically for a wideband multiple PMI mode, UE-selected multiple PMI mode, and/or for single PMI modes configured at higher protocol layers. For each of the CSI reporting modes, RI is typically reported to maximize downlink throughput and the reported PMI is conditioned on the reported RI.

In certain circumstances, the RI reported by a UE 704 may not be aligned with the intended rank for scheduling of PDSCH transmission 706 by the eNB 702 to the UE 704. For example, UE 704 may report rank 2, while the eNB 702 may schedule, or intend to schedule PDSCH for the UE 704 using rank 1, and/or using MU-MIMO operation. Additionally, since a PMI corresponds to a certain rank, the precoding information obtained from a first PMI conditioned on the first reported RI may not be optimal for a second reported RI. Furthermore, the number of PMIs included in the codebook may vary by rank, and a PMI index reported for a first rank may not necessarily be equivalent to a PMI index for the codebook entries for a second rank.

In a first embodiment, a UE 704 may report a PMI and RI combination that targets a balanced performance among different ranks. For example, a UE 704 may report a non-optimal PMI for rank 2, which may provide a variance of 5% from optimal rank 2 performance in one example, but which achieves significantly better performance in rank 1, when a rank-1 precoder is extracted from the optimal rank 2 PMI. This approach can produce a reasonable tradeoff between SU-MIMO and MU-MIMO performance. However, alternative approaches disclosed herein enable multiple rank reports and reduce the need for tradeoffs in PMI selection. That is, when selecting a PMI to report, the UE may pick a PMI that provides the best overall performance over multiple ranks, instead of the best performance at a specific rank.

Some embodiments provide multi-rank feedback reporting that can enhance SU-MIMO and MU-MIMO operation. In one example, a PMI corresponding to each of a plurality of different ranks is provided in feedback with different frequency granularities. For example, one PMI may correspond to a wideband rank, while another PMI corresponds to a sub-band specific rank. For enhanced MU-MIMO support a rank-1 PMI may be provided on a subband-level to enhance MU-MIMO beam selection, while a single wideband rank-2 or higher PMI may be sufficient for SU-MIMO operation.

In some embodiments rank-specific reports may be triggered implicitly by requesting such reports on certain subframes. One or more subframe sets may be defined that are associated with a certain rank to be reported by the UE 704. When an aperiodic report is triggered, the UE 704 reports CSI feedback 708 for the rank associated with the subframe set to which the reference subframe belongs. Subframe sets may also be associated with multiple ranks and CSI feedback 708 for multiple ranks may be conveyed in the same report using, for example, aperiodic feedback on PUSCH. In another aspect, when subframe sets are associated with multiple ranks, the UE may also downselect and report CSI only for a subset of the multiple ranks A rank-specific report may include PMI and CQI values that are associated with a RI.

In some embodiments, codebook subset restriction may be configured separately for each of the multi-rank reports. The usage of one or more PMIs may be restricted to obtain increased download throughput and reduce inter-cell interference. Accordingly, a codebookSubsetRestriction parameter may be configured separately for each of a plurality of rank reports. In some embodiments, an existing bitmap may be modified to account for multi-rank operation. For example, one bitmap may specify which PMIs are disabled on a per-rank basis. A second bitmap may specify, for each of the multi-rank reports, which ranks are admissible for the report.

In some embodiments, rank-specific reports may be dynamically triggered. Additional bits in the DCI format may dynamically indicate to the UE 704 which rank is used for CSI reporting 708. The additional bits may also indicate whether the UE 704 should provide a single rank report or multiple rank reports. Rank-specific reports may be dynamically triggered using a 2-bit field assigned for aperiodic CSI triggering in a carrier aggregation context. For example, the 2-bit field may be used to indicate one of three possible combinations.

In some embodiments, additional aperiodic CSI feedback modes using PUSCH may be employed by a UE 704 to provide feedback in two separate CSI reports. For example, one report may be conditioned on measurements associated with a set of UE 704 selected subbands, while the other may be conditioned on measurements associated with all available subbands. UE 704 selected subbands may be conveyed to the eNB 702 by the UE 704 through a bitmap. UEs may provide CSI feedback 708 under different RIs for the UE-selected preferred subbands and all subbands, respectively. For example, UE 704 may report rank 1 for the UE-selected subbands to improve MU-MIMO performance, while PMI/CQI information corresponding to a rank higher than rank 1 may be conveyed on a wideband basis. The bitmap used to convey the subband selection may be adapted and/or enhanced to permit more flexibility in conveying preferred subbands.

In some embodiments, multi-rank support may be provided for additional periodic CSI feedback modes. When periodic reporting modes are used, a UE 704 may report CSI according to a predetermined timeline that is signaled to the UE 704 by RRC configuration 710. The RI and, where reported, precoder type feedback or precoder type indicators (PTI) are typically reported in separate reporting instances. PMI/CQI reports are typically conditioned on the last transmitted RI and PTI, if reported. The payload for periodic reporting may be limited to a predefined number of bits. Accordingly, multiple separate periodic reporting instances may be configured for multi-rank reporting. Each periodic reporting instance may be tied to a certain RI that is configured through RRC signaling 710 as part of the periodic CSI reporting configuration. In some embodiments, a rank-restriction bitmap may be employed to limit the admissible ranks that can be reported by the UE 704. In some embodiments, RI transmission may be selectively suppressed in CSI reporting 708, whereby the RI may or may not be transmitted by the UE 704. For example, RI may be transmitted when the multi-rank feedback allows the UE 704 to select from more than one admissible value. When only a single RI value is admissible, the RI report may be omitted. If PTI is to be reported together with RI, then the report may be sent, or only the RI field may be omitted.

In some embodiments, rank-specific reporting may be based on coordinated multipoint transmission (CoMP) CSI reporting instances. In CoMP, CSI reporting 708 may be based on separately configured channel measurement resources (CMRs) and interference measurement resources (IMRs). A CMR may comprise a non-zero power CSI-RS resource that is used by the UE 704 to perform channel estimation. Multiple CMRs may be supported and may comprise the CoMP measurement set. An IMR may comprise zero-power and/or non-zero power CSI-RS resources that are used by the UE 704 to perform interference estimation. One or more IMRs may be supported. In some embodiments, multiple CSI feedback 708 instances may be available through CoMP, and each CSI feedback 708 instance may be defined by a linkage of one CMR and one IMR.

In some embodiments, rank-restriction may be specified for each CSI feedback 708 instance. For example, the UE 704 may be restricted to consider only a subset of possible RI values for a specific CSI feedback 708 instance. One or more CSI reports may be characterized by such RI restriction. A rank-restriction bitmap may be defined to signal the admissible rank values to the UE 704 when only a single CSI report comprising a UE-selected RI value is to be reported in CSI feedback 708. The rank-restriction bitmap may be extended to allow multiple rank restrictions, each corresponding to a separate CSI report, when multiple CSI reports are desired. For example, if two CSI reports are desired one may be restricted to rank 1 only and another may allow for rank 1 or higher.

Some embodiments provide interdependency among different CSI reporting configurations. For example, if the rank selected by a UE 704 for one reporting configuration (e.g., in the case of rank 1 or higher) is the same as for another CSI reporting configuration, then one report may be omitted, since the reports may contain identical information. In some embodiments, the report may be sent if PMI/CQI differs between the configurations, such as when a different IMR is used to generate the report and only the RI are the same.

In some embodiments, certain conditions may be specified across the UE-selected RIs for different reporting instances. For example, the UE 704 may be required to select the RI associated with one reporting configuration to be no larger than the RI associated with another reporting configuration, thereby facilitating a trade-off between SU-MIMO and MU-MIMO performance. In some embodiments, the rank reported by the UE 704 for MU-MIMO may be constrained to be no larger than the rank reported for SU-MIMO.

In certain embodiments, rank-specific reporting using a CoMP CSI reporting instance may be combined with dynamic and/or semi-static signaling, such as subframe sets, dynamic triggering, etc. Even where a rank-restriction bitmap allows for a single CSI reporting configuration, multiple rank-restricted reporting configurations may be accomplished by configuring separate CSI feedback instances that map to corresponding CMR and IMR. A separately configured CSI reporting configuration may be required for such rank-restricted reporting.

Rank-restriction offers various advantages when used with CoMP in addition to general advantages associated with performance tradeoff between SU-MIMO and MU-MIMO. Rank-restriction may enable the network to schedule a certain rank on certain subframes. For example, the network can take steps to schedule with rank 1 on one set of subframes when the UE 704 is restricted to reporting rank 1 on the set of subframes, such as "unclean" subframes where the macro is active. This may improve performance for another class of UEs 704 that is impacted by the macro interference, e.g., UEs 704 in the cell-range expansion region of an adjacent pico cell.

In addition to multi-rank PMI reports, wideband and sub-band CQIs corresponding to additional RI/PMIs may be reported. In some embodiments, additional reporting may be performed primarily using aperiodic CSI reports when periodic CSI reporting is subject to limitations on CSI payload. For example, CSI payload may be limited to 11 bits per report while aperiodic CSI reporting may have more relaxed limitations on CSI payload in which the payload size may be limited on a per carrier basis to approximately 70 bits for a 20 MHz system. When carrier aggregation is used, the limit on payload size for aperiodic CSI may be increased to 300+ bits.

Another approach for supporting rank-restricted CSI feedback for CoMP is to define a reference CSI process. For example, if two CSI processes are desired for performing CSI reporting with the same rank, one of the two CSI processes may be designated as a "reference process." The other of the two CSI processes linked to the reference process would then be constrained to selecting the same rank as that of the reference process. The designation of the reference process and the linked process may be performed via RRC configuration.

The reference process may be associated with RI feedback and subband selection for PUCCH mode 2-1. For the latter case, similar to the rank, any CSI process linked to a reference process may simply reuse the subband selection of the reference process and perform a computation of remaining feedback metrics (e.g., PMI, CQI) conditioned on the "inherited" properties of the reference process.

The use of such a reference process leads to several solutions which are addressed herein. In one aspect, the definition of a reference process impacts the feedback timeline for periodic feedback reporting. In particular, depending on the feedback mode, the feedback reporting timeline may include wideband and/or subband PMI/CQI reports that are conditioned on previous RI and/or PMI reports. Typically, RI is reported with a periodicity that is an integer multiple of the time period it takes to cycle across all PMI/CQI reports of the system bandwidth. For example, in PUCCH mode 2-1 such cycling is performed across bandwidth parts. In the absence of a reference process, the rank can therefore only change after an entire cycle has been completed. However, when a reference process is configured it may be possible that the RI periodicity or offset are configured in a way such that the RI of the reference process changes while the linked process undergoes a cycle of PMI/CQI reports. In this case, it is unclear whether the UE should immediately start using the latest reported RI value or whether it should first complete the PMI/CQI reporting cycle before doing so. If the UE were to immediately start using the updated RI value, several complications arise including inconsistencies between PMI reports (conditioning on the old vs. the new RI) and CQI reports that are supposed to be conditioned on an incompatible combination of RI and PMI reports. Similar issues arise for the PTI selection.

In a further aspect, the aforementioned incompatibilities may be resolved by restricting the configuration of the reporting timelines between the reference CSI process and its one or more linked CSI processes. For example, by carefully selecting the RI reporting period and the periodicities of RI/PMI reporting, the reporting timelines of reference/linked processes can be aligned such that the RI, subband selection, or PTI changes do not lead to incompatible conditioning for the linked CSI process (e.g., by having the RI reports occur in consecutive or close-by sub frames).

In another aspect, the aforementioned incompatibility may be avoided by not immediately applying updated RI, PTI, or subband metrics of the reference process. Instead, if RI, PTI, or subband metrics change while the linked process is within a PMI/CQI reporting cycle, the UE will continue based on the old RI, PTI or subband metrics. Only after the cycle has been completed, the UE will use the updated RI, PTI or subband information of the reference process.

In a particular aspect, the RI, PTI, or subband selection between the reference and linked processes may be linked directly, rather than to condition the PMI/CQI computation of the linked processes to the RI, PTI, or subband selection of the reference process. By linking the RI, PTI, or subband selection directly, it is ensured that for each linked process, the RI, PTI, or subband selection changes only at times that would anyway allow the linked process to change the corresponding values. In this case, the PMI/CQI computation of the linked process would continue to be based only on the RI, PTI, and subband selection of the linked process (and not the reference process). However, the RI, PTI, and subband selection of the linked process would be tied directly to the RI, PTI, and subband selection of the reference process.

In another aspect, although the CSI reference process has only been discussed with respect to subband selection in PUCCH mode 2-1 and for the RI, it may be extended to other reporting modes such as PUSCH mode 2-2, and other feedback metrics such as the Precoding Type Indicator (PTI). Specifically, for PUSCH mode 2-2, a preferred set of subbands is selected for aperiodic reporting. By configuring a CSI process with a reference process, the UE may be configured to reuse the preferred subbands selection of the reference process for the linked process. Regarding the extension to PTI, which is used for periodic reporting in PUCCH mode 2-1 (with 8Tx configured), the PTI selection from the reference process may be reused by the linked process. This also has the benefit of the reporting timelines of wideband and subband PMI/CQI being aligned between the reference and the linked CSI processes.

Figure 8:
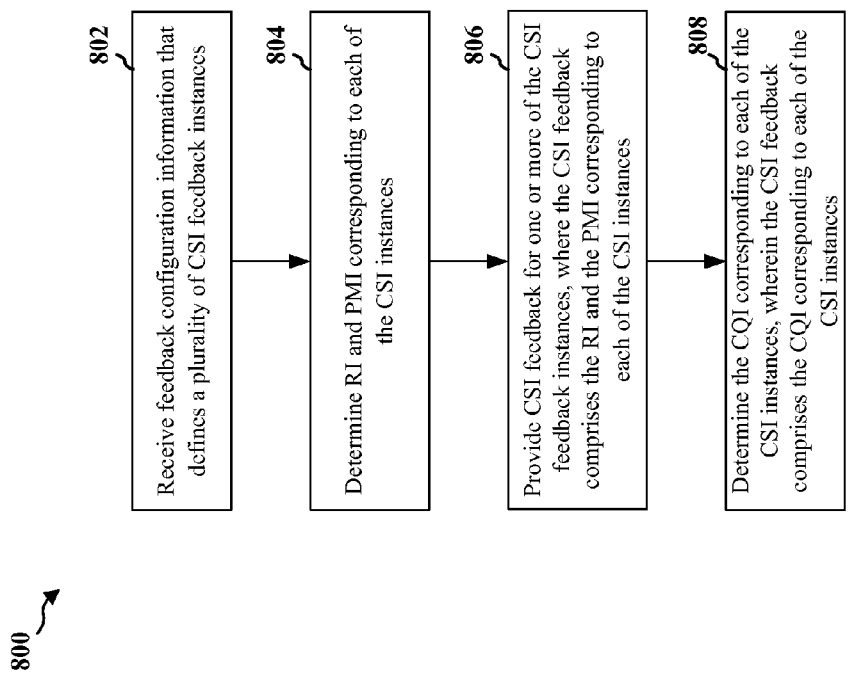
FIG. 8 is a flow chart of a method of wireless communication.

FIG. 8 is a flow chart 800 of a method of wireless communication. The method may be performed by a UE 704.

At step 802, the UE 704 receives feedback configuration information that defines a plurality of CSI feedback instances. Each CSI feedback instance may be conditioned on one of a set of admissible rank values. In some embodiments, receiving the feedback configuration includes receiving a bitmap specifying rank values that are admissible for each CSI feedback instance. In some embodiments, receiving the feedback configuration includes conditioning each CSI feedback instance by the set of admissible rank values by determining RI among the rank values that are specified to be admissible in the bitmap. In some embodiments, receiving the feedback configuration includes receiving a bitmap specifying combinations of RI and PMI that are admissible for each CSI feedback instance, and the RI and PMI may be determined for combinations which are specified as admissible in the bitmap.

In some embodiments, receiving the feedback configuration includes receiving signaling that associates each of one or more sets of subframes with one or more rank values. In some embodiments, receiving the feedback configuration includes determining the set of admissible rank values for each CSI instance based on the one or more rank values associated with the subframe set which includes a reference subframe. In some embodiments, the feedback configuration information identifies the rank used for reporting the CSI feedback 708.

In some embodiments, the feedback configuration information identifies a plurality of ranks for which RI and PMI are reported in the CSI feedback 708 through additional bits in a DCI format requesting an aperiodic feedback report. The feedback information may identify the set of admissible rank values through RRC-based configuration for periodic feedback reporting. In some embodiments, the feedback configuration information disables one or more PMIs in a codebook for each CSI feedback instance.

At step 804, the UE 704 determines a RI and a PMI corresponding to each of the CSI instances. In some embodiments, the PMI is determined with a frequency granularity for the one or more CSI feedback instances. The frequency granularity may be determined based on a rank selected for the one or more CSI feedback instances. In some embodiments, the PMI is determined and reported with a frequency granularity for a selected CSI feedback instance, the frequency granularity being determined based on a rank selected for the one or more CSI feedback instances. The frequency with which PMI is determined and reported for one of the CSI feedback instances is selected based on a rank corresponding to the one CSI feedback instance.

At step 806, the UE 704 provides CSI feedback 708 for one or more of the CSI feedback instances. The CSI feedback 708 comprises the RI and the PMI corresponding to each of the CSI instances. Providing CSI feedback 708 for the one or more ranks may include determining a set of subbands from a plurality of subbands, providing a first CSI feedback report corresponding to the set of subbands, and providing a second CSI feedback report corresponding to the plurality of subbands.

In some embodiments, the RI and the PMI corresponding to each of the CSI instances are determined based on channel measurements on a channel measurement resource and interference measurements on an interference measurement resource.

At step 808, the UE 704 determines a CQI corresponding to each of the CSI instances. The CSI feedback 708 may comprise the CQI corresponding to each of the CSI instances.

Figure 9:
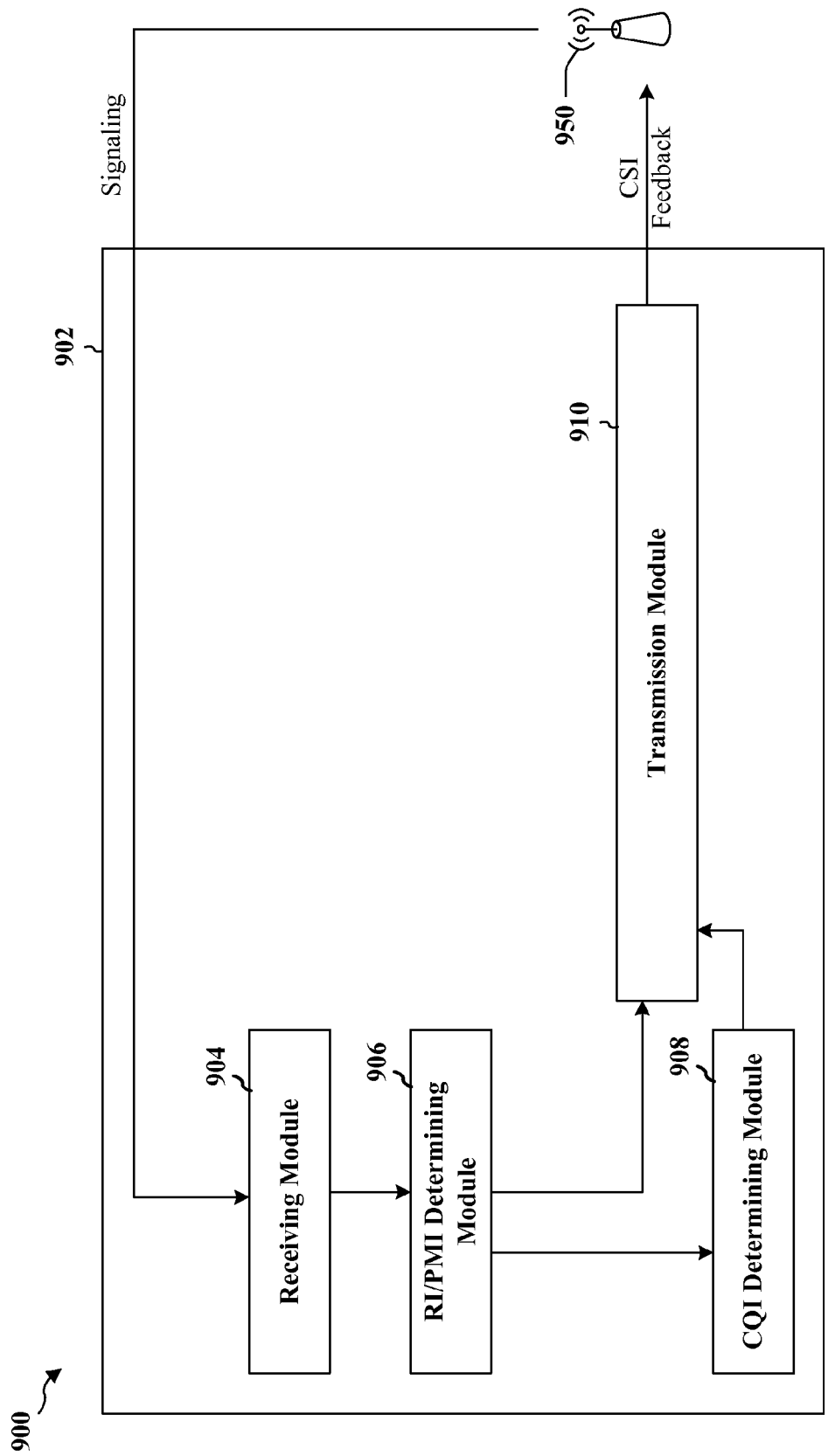
FIG. 9 is a conceptual data flow diagram illustrating the data flow between different modules/means/components in an exemplary apparatus.

FIG. 9 is a conceptual data flow diagram 900 illustrating the data flow between different modules/means/components in an exemplary apparatus 902. The apparatus may be a UE 704. The apparatus includes a receiving module 904 that receives feedback configuration information defining a plurality of CSI feedback instances, a module 906 that determines RI and PMI corresponding to the CSI instances, a module 908 that determines CQI corresponding to the CSI instances, and a transmission module 910 that transmits CSI feedback 708 to eNB 950.

The apparatus may include additional modules that perform each of the steps of the algorithm in the aforementioned flow charts of FIG. 8. As such, each step in the aforementioned flow charts of FIG. 8 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 10:
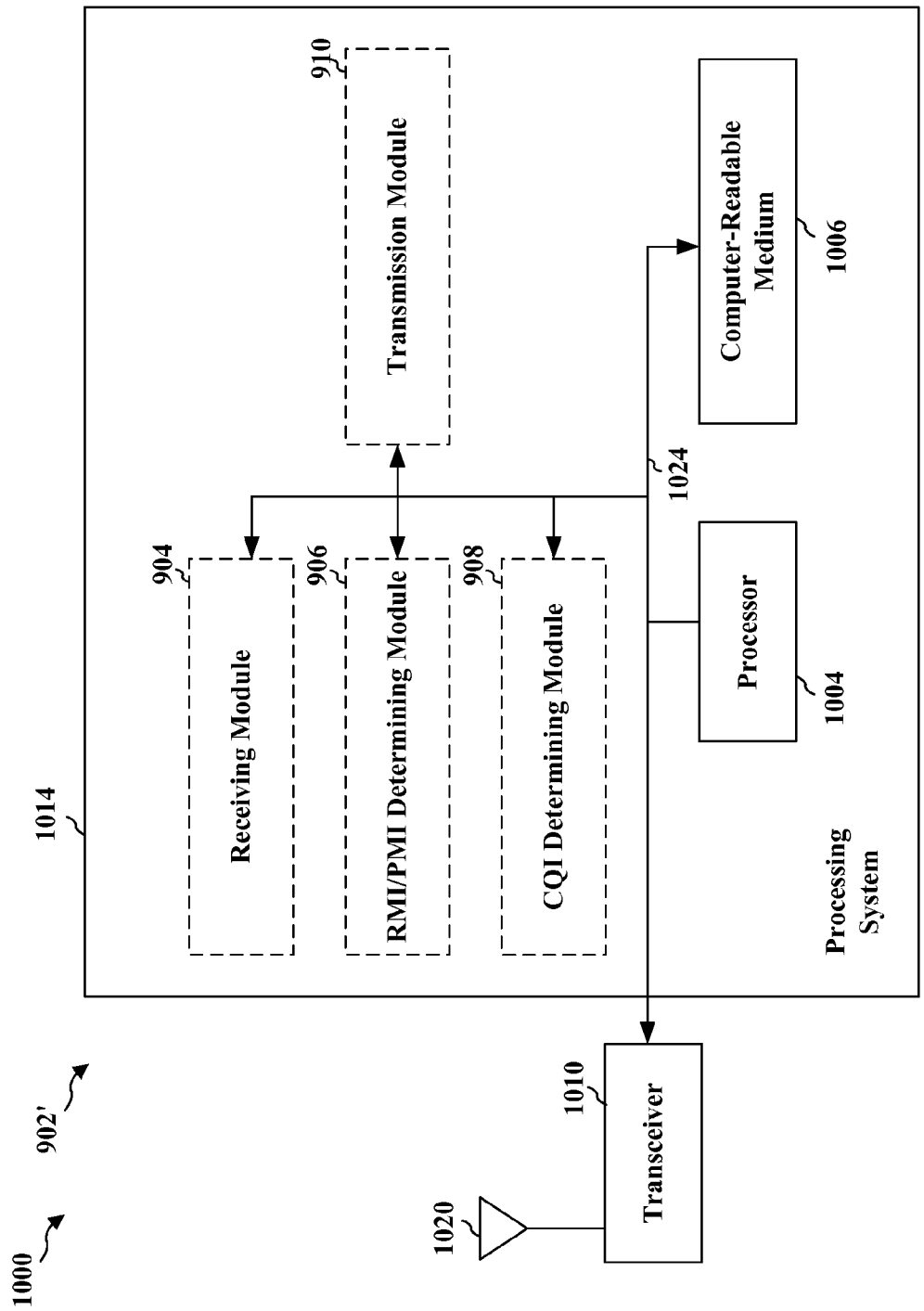
FIG. 10 is a diagram illustrating an example of a hardware implementation for an apparatus employing a processing system.

FIG. 10 is a diagram 1000 illustrating an example of a hardware implementation for an apparatus 902' employing a processing system 1014. The processing system 1014 may be implemented with a bus architecture, represented generally by the bus 1024. The bus 1024 may include any number of interconnecting buses and bridges depending on the specific application of the processing system 1014 and the overall design constraints. The bus 1024 links together various circuits including one or more processors and/or hardware modules, represented by the processor 1004, the modules 904, 906, 908, 910, and the computer-readable medium 1006. The bus 1024 may also link various other circuits such as timing sources, peripherals, voltage regulators, and power management circuits, which are well known in the art, and therefore, will not be described any further.

The processing system 1014 may be coupled to a transceiver 1010. The transceiver 1010 is coupled to one or more antennas 1020. The transceiver 1010 provides a means for communicating with various other apparatus over a transmission medium. The processing system 1014 includes a processor 1004 coupled to a computer-readable medium 1006. The processor 1004 is responsible for general processing, including the execution of software stored on the computer-readable medium 1006. The software, when executed by the processor 1004, causes the processing system 1014 to perform the various functions described supra for any particular apparatus. The computer-readable medium 1006 may also be used for storing data that is manipulated by the processor 1004 when executing software. The processing system further includes at least one of the modules 904, 906, 908, and 910. The modules may be software modules running in the processor 1004, resident/stored in the computer readable medium 1006, one or more hardware modules coupled to the processor 1004, or some combination thereof. The processing system 1014 may be a component of the UE 650 and may include the memory 660 and/or at least one of the TX processor 668, the RX processor 656, and the controller/processor 659.

In one configuration, the apparatus 902/902' for wireless communication includes means 904 for means for receiving feedback configuration information that defines a plurality of CSI feedback instances, means 906 for determining RI and PMI corresponding to each of the CSI instances, means 908 for determining a CQI corresponding to each of the CSI instances, and means 910 for providing CSI feedback 708 for one or more of the CSI feedback instances.

Each CSI feedback instance may be conditioned on one of a set of admissible rank values and the CSI feedback 708 may comprise the RI and the PMI corresponding to each of the CSI instances. The CSI feedback 708 may comprise the CQI corresponding to each of the CSI instances. PMI and RI may be determined with a frequency granularity for CSI feedback instances whereby the frequency granularity is determined based on a rank selected for the one or more CSI feedback instances.

The feedback configuration information may include a bitmap specifying rank values that are admissible for each CSI feedback instance. The feedback configuration information may condition each CSI feedback instance by the set of admissible rank values by determining RI among the rank values that are specified to be admissible in the bitmap.

The means for receiving the feedback configuration information may receive a bitmap specifying combinations of RI and PMI that are admissible for each CSI feedback instance, and may determine the RI and PMI for combinations which are specified as admissible in the bitmap. The feedback configuration information may identify the rank used for reporting the CSI feedback 708. The feedback configuration information may identify a plurality of ranks for which RI and PMI are reported in the CSI feedback 708 through additional bits in a DCI format requesting an aperiodic feedback report. The feedback information may identify the set of admissible rank values through RRC-based configuration for periodic feedback reporting.

The means for providing CSI feedback 708 for the one or more ranks may determine a set of subbands from a plurality of subbands, provide a first CSI feedback report corresponding to the set of subbands, and provide a second CSI feedback report corresponding to the plurality of subbands. The RI and the PMI corresponding to each of the CSI instances may be determined based on channel measurements on a channel measurement resource and interference measurements on an interference measurement resource. The feedback configuration information may disable one or more PMIs in a codebook for each CSI feedback instance.

The aforementioned means may be one or more of the aforementioned modules of the apparatus 902 and/or the processing system 1014 of the apparatus 902' configured to perform the functions recited by the aforementioned means. As described supra, the processing system 1014 may include the TX Processor 668, the RX Processor 656, and the controller/processor 659. As such, in one configuration, the aforementioned means may be the TX Processor 668, the RX Processor 656, and the controller/processor 659 configured to perform the functions recited by the aforementioned means.

Figure 11:
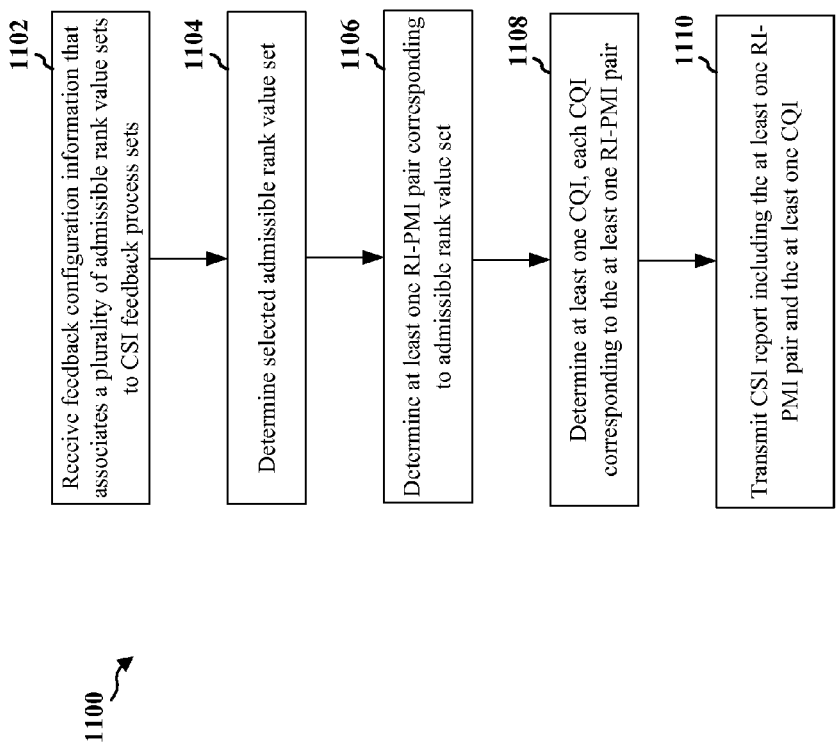
FIG. 11 is a flow chart of a method of wireless communication.

FIG. 11 is a flow chart 1100 of a method of wireless communication. The method may be performed by a UE 704.

At step 1102, the UE 704 receives feedback configuration information that associates a plurality of admissible rank value sets to channel state information (CSI) feedback process sets. Each admissible rank value set may include at least one rank indicator (RI) and precoding matrix indicator (PMI) pair (RI-PMI pair). An admissible rank value set may also exclude certain RI-PMI pairs. Each CSI feedback process set may include at least one CSI feedback process, and each CSI feedback process may be based on an admissible rank value set from the plurality of admissible rank value sets.

At step 1104, the UE 704 determines a selected admissible rank value set based on the plurality of admissible rank value sets. The selected admissible rank value set includes a plurality of admissible rank values. The UE 704 may base the selection on signaling from a base station (e.g., base station 702). Moreover, the selected admissible rank value set may be determined based on one or more sets of subframes for which a CSI report is scheduled.

At step 1106, the UE 704 determines at least one RI-PMI pair corresponding to the selected admissible rank value set. In an aspect, a PMI of the determined at least one RI-PMI pair corresponds to a PMI providing optimal performance over a plurality of admissible rank values of the selected admissible rank value set. At step 1108, the UE 704 determines at least one channel quality indicator (CQI). Each CQI may correspond to one of the at least one RI-PMI pair. At step 1110, the UE 704 may transmit the CSI report including the at least one RI-PMI pair and the at least one CQI to the base station.

In an aspect, the feedback configuration information identifies the plurality of admissible rank value sets for which the at least one RI-PMI pair is reported in the CSI report through additional bits in a downlink control information (DCI) format requesting an aperiodic feedback report.

In another aspect, the UE 704 may receive the feedback configuration information by receiving a bitmap specifying an admissible rank value set associated to each CSI feedback process set, and conditioning each CSI feedback process set by the admissible rank value set by determining at least one RI from the admissible rank value set specified in the bitmap. Additionally or alternatively, the UE 704 may receive the feedback configuration information by receiving a bitmap specifying at least one admissible RI-PMI pair associated to each CSI feedback process set, wherein an RI and a PMI are determined for the at least one admissible RI-PMI pair specified in the bitmap.

In a further aspect, an RI and a PMI of at least one RI-PMI pair associated to each of the CSI feedback process sets are determined based on channel measurements on a channel measurement resource and interference measurements on an interference measurement resource. The feedback configuration information may disable one or more PMIs in a codebook for each CSI feedback process set.

In yet another aspect, the PMI may be determined with a frequency granularity for the at least one CSI feedback process. The frequency granularity may be determined based on a rank value selected for the at least one CSI feedback process. The feedback configuration information may identify the admissible rank value sets through RRC-based configuration for periodic feedback reporting. Moreover, the UE 704 may transmit the CSI report by determining a set of subbands from a plurality of subbands, providing a first CSI report corresponding to the set of subbands, and providing a second CSI report corresponding to the plurality of subbands.

Figure 12:
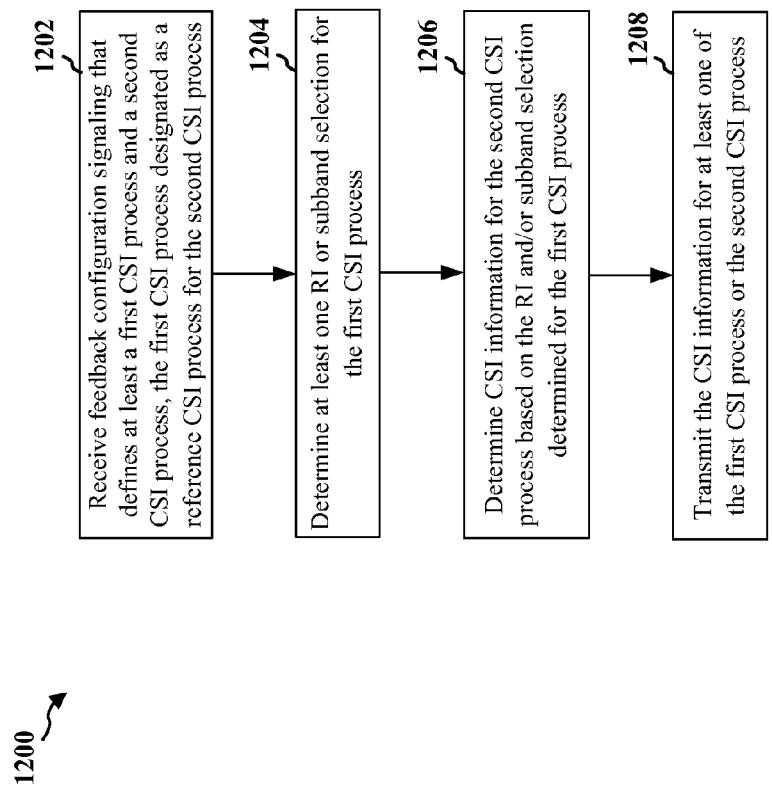
FIG. 12 is a flow chart of a method of wireless communication.

FIG. 12 is a flow chart 1200 of a method of wireless communication. The method may be performed by a UE 704.

At step 1202, the UE 704 receives feedback configuration signaling that defines at least a first channel state information (CSI) process and a second CSI process. The first CSI process may be designated as a reference CSI process for the second CSI process. At step 1204, the UE 704 determines at least one of a rank indicator (RI) or a subband selection for the first CSI process based on measurements associated with the first CSI process.

At step 1206, the UE 704 determines CSI information for the second CSI process based on the RI and/or subband selection determined for the first CSI process. The CSI information for the second CSI process may include at least one of a RI, a precoding matrix indicator (PMI), a channel quality indicator (CQI), a subband selection, or a precoding type indicator (PTI). The CSI information for the second CSI process may be further based on a PTI associated with the first CSI process when the PTI is configured for the first CSI process and when the CSI information for the second CSI process is based on the RI for the first CSI process.

In an aspect, the PMI and CQI associated with the second CSI process are determined based on the RI and/or subband selection associated with the first CSI process. Moreover, a PMI and CQI feedback timeline, associated with a periodic reporting configuration of the second CSI process, are configured to avoid incompatible conditioning with respect to the RI and/or subband selection of the first CSI process.

In another aspect, the PMI and CQI associated with the second CSI process are determined based on a last reported RI and/or last reported subband selection of the first CSI process that occurred on or before a start of a reporting cycle of the second CSI process.

In a further aspect, the PMI and CQI associated with the second CSI process are determined based on a last reported RI and/or last reported subband selection of the second CSI process. Moreover, the RI and/or subband selection of the second CSI process is inherited from a last reported RI and/or subband selection of the first CSI process.

At step 1208, the UE 704 transmits the CSI information for at least one of the first CSI process or the second CSI process. In an aspect, the first CSI process and the second CSI process are configured to use periodic or aperiodic feedback reporting. In a further aspect, if the first CSI process and the second CSI process are configured to use aperiodic feedback reporting based on a physical uplink shared channel (PUSCH) mode 2-2, the second CSI process selects an associated set of preferred subbands to be the same as a set of preferred subbands determined for the first CSI process.

Figure 13:
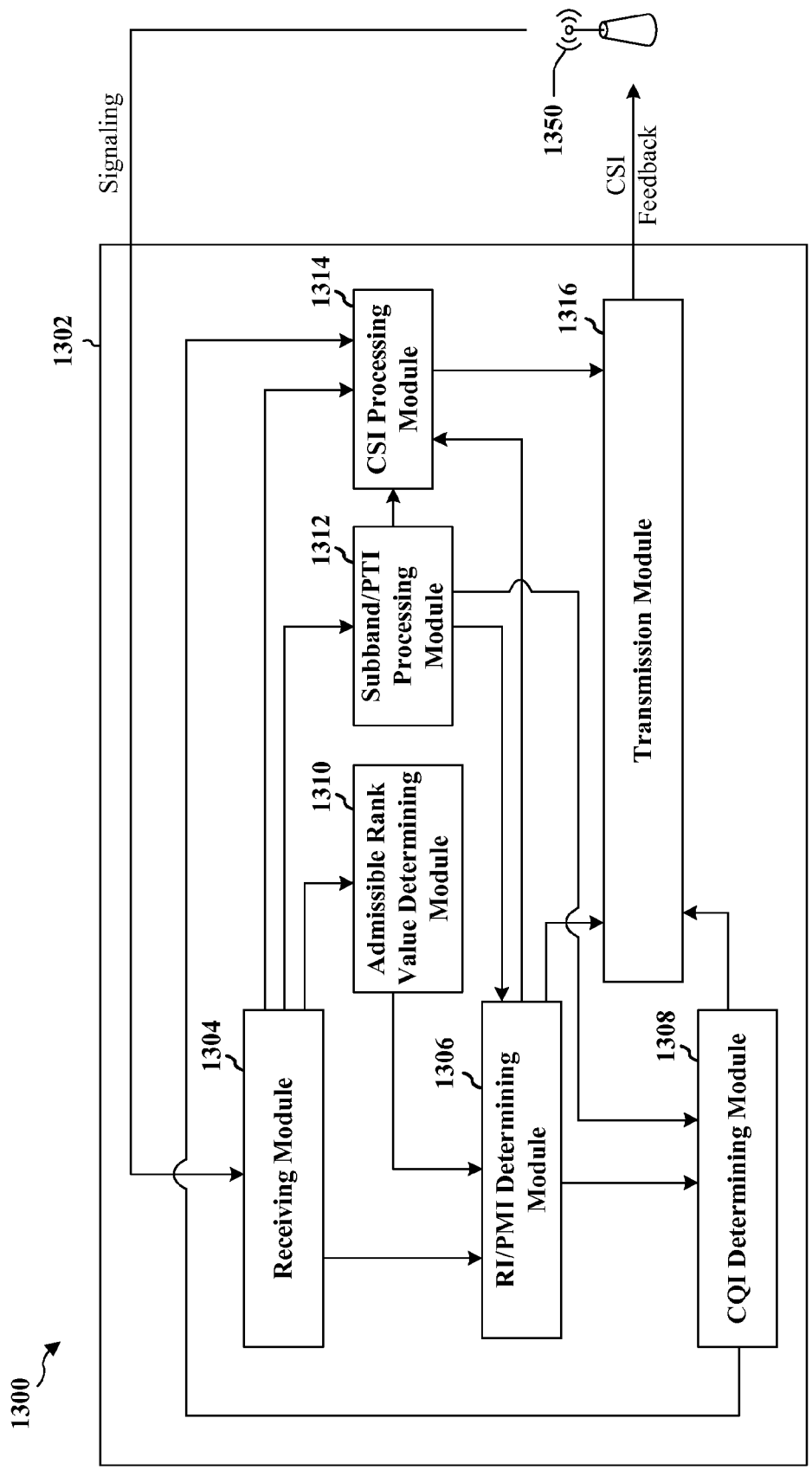
FIG. 13 is a conceptual data flow diagram illustrating the data flow between different modules/means/components in an exemplary apparatus.

FIG. 13 is a conceptual data flow diagram 1300 illustrating the data flow between different modules/means/components in an exemplary apparatus 1302. The apparatus may be a UE (e.g., UE 704). The apparatus includes a receiving module 1304, an RI/PMI determining module 1306, a CQI determining module 1308, an admissible rank value determining module 1310, a subband/PTI processing module 1312, a CSI processing module 1314, and a transmission module 1316.

The receiving module 1304 receives feedback configuration information that associates a plurality of admissible rank value sets to channel state information (CSI) feedback process sets. Each admissible rank value set may include at least one rank indicator (RI) and precoding matrix indicator (PMI) pair (RI-PMI pair). An admissible rank value set may also exclude certain RI-PMI pairs. Each CSI feedback process set may include at least one CSI feedback process, and each CSI feedback process may be based on an admissible rank value set from the plurality of admissible rank value sets.

The admissible rank value determining module 1310 determines a selected admissible rank value set based on the plurality of admissible rank value sets. The selected admissible rank value set includes a plurality of admissible rank values. The admissible rank value determining module 1310 may base the selection on signaling from a base station (e.g., base station 1350). Moreover, the selected admissible rank value set may be determined based on one or more sets of subframes for which a CSI report is scheduled.

The RI/PMI determining module 1306 determines at least one RI-PMI pair corresponding to the selected admissible rank value set. In an aspect, a PMI of the determined at least one RI-PMI pair corresponds to a PMI providing optimal performance over a plurality of admissible rank values of the selected admissible rank value set. The CQI determining module 1308 determines at least one channel quality indicator (CQI), wherein each CQI may correspond to one of the at least one RI-PMI pair. The transmission module 1316 may transmit to the base station 1350 the CSI report including the at least one RI-PMI pair (determined by the RI/PMI determining module 1306) and the at least one CQI (determined by the CQI determining module 1308).

In an aspect, the feedback configuration information identifies the plurality of admissible rank value sets for which the at least one RI-PMI pair is reported in the CSI report through additional bits in a downlink control information (DCI) format requesting an aperiodic feedback report.

In another aspect, the admissible rank value determining module 1310 may receive (via the receiving module 1304) the feedback configuration information by receiving a bitmap specifying an admissible rank value set associated to each CSI feedback process set. Accordingly, the RI/PMI determining module 1306 may condition each CSI feedback process set by the admissible rank value set by determining at least one RI from the admissible rank value set specified in the bitmap. Additionally or alternatively, the RI/PMI determining module 1306 may receive the feedback configuration information by receiving a bitmap specifying at least one admissible RI-PMI pair associated to each CSI feedback process set, wherein the RI/PMI determining module 1306 determines an RI and a PMI for the at least one admissible RI-PMI pair specified in the bitmap.

In a further aspect, the RI/PMI determining module 1306 determines an RI and a PMI of at least one RI-PMI pair associated to each of the CSI feedback process sets based on channel measurements on a channel measurement resource and interference measurements on an interference measurement resource. The feedback configuration information may disable one or more PMIs in a codebook for each CSI feedback process set.

In yet another aspect, the RI/PMI determining module 1306 may determine the PMI with a frequency granularity for the at least one CSI feedback process. The frequency granularity may be determined based on a rank value selected for the at least one CSI feedback process. The feedback configuration information may identify the admissible rank value sets through RRC-based configuration for periodic feedback reporting. Moreover, the transmission module 1316 may transmit the CSI report by determining (via the subband/PTI processing module 1312) a set of subbands from a plurality of subbands, providing a first CSI report corresponding to the set of subbands, and providing a second CSI report corresponding to the plurality of subbands.

In an aspect, the receiving module 1304 receives feedback configuration signaling that defines at least a first channel state information (CSI) process and a second CSI process. The first CSI process may be designated as a reference CSI process for the second CSI process. The RI/PMI determining module 1306 may determines a rank indicator (RI) for the first CSI process based on measurements associated with the first CSI process. Additionally or alternatively, the subband/PTI processing module 1312 determines a subband selection for the first CSI process based on measurements associated with the first CSI process.

The CSI processing module 1314 determines CSI information for the second CSI process based on the RI and/or subband selection determined for the first CSI process. The CSI information for the second CSI process may include at least one of a RI, a precoding matrix indicator (PMI), a channel quality indicator (CQI), a subband selection, or a precoding type indicator (PTI). The CSI information for the second CSI process may be further based on a PTI associated with the first CSI process when the PTI is configured for the first CSI process and when the CSI information for the second CSI process is based on the RI for the first CSI process.

In an aspect, the RI/PMI determining module 1306 determines the PMI associated with the second CSI process based on the RI and/or subband selection associated with the first CSI process. Moreover, the CQI determining module 1308 determines the CQI associated with the second CSI process based on the RI and/or subband selection associated with the first CSI process. A PMI and CQI feedback timeline, associated with a periodic reporting configuration of the second CSI process, are configured to avoid incompatible conditioning with respect to the RI and/or subband selection of the first CSI process.

In another aspect, the RI/PMI determining module 1306 determines the PMI associated with the second CSI process based on a last reported RI and/or last reported subband selection of the first CSI process that occurred on or before a start of a reporting cycle of the second CSI process. Moreover, the CQI determining module 1308 determines the CQI associated with the second CSI process based on a last reported RI and/or last reported subband selection of the first CSI process that occurred on or before a start of a reporting cycle of the second CSI process.

In a further aspect, the PMI and CQI associated with the second CSI process are determined (by the RI/PMI determining module 1306 and the CQI determining module 1308, respectively) based on a last reported RI and/or last reported subband selection of the second CSI process. Moreover, the RI and/or subband selection of the second CSI process is inherited from a last reported RI and/or subband selection of the first CSI process.

The CSI processing module 1314 transmits (via the transmission module 1316) the CSI information for at least one of the first CSI process or the second CSI process. In an aspect, the first CSI process and the second CSI process are configured to use aperiodic feedback reporting based on a physical uplink scheduling channel (PUSCH) mode 2-2, and the second CSI process selects an associated set of preferred subbands to be the same as a set of preferred subbands determined for the first CSI process.

The apparatus may include additional modules that perform each of the steps of the algorithm in the aforementioned flow charts of FIGS. 11-12. As such, each step in the aforementioned flow charts of FIGS. 11-12 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 14:
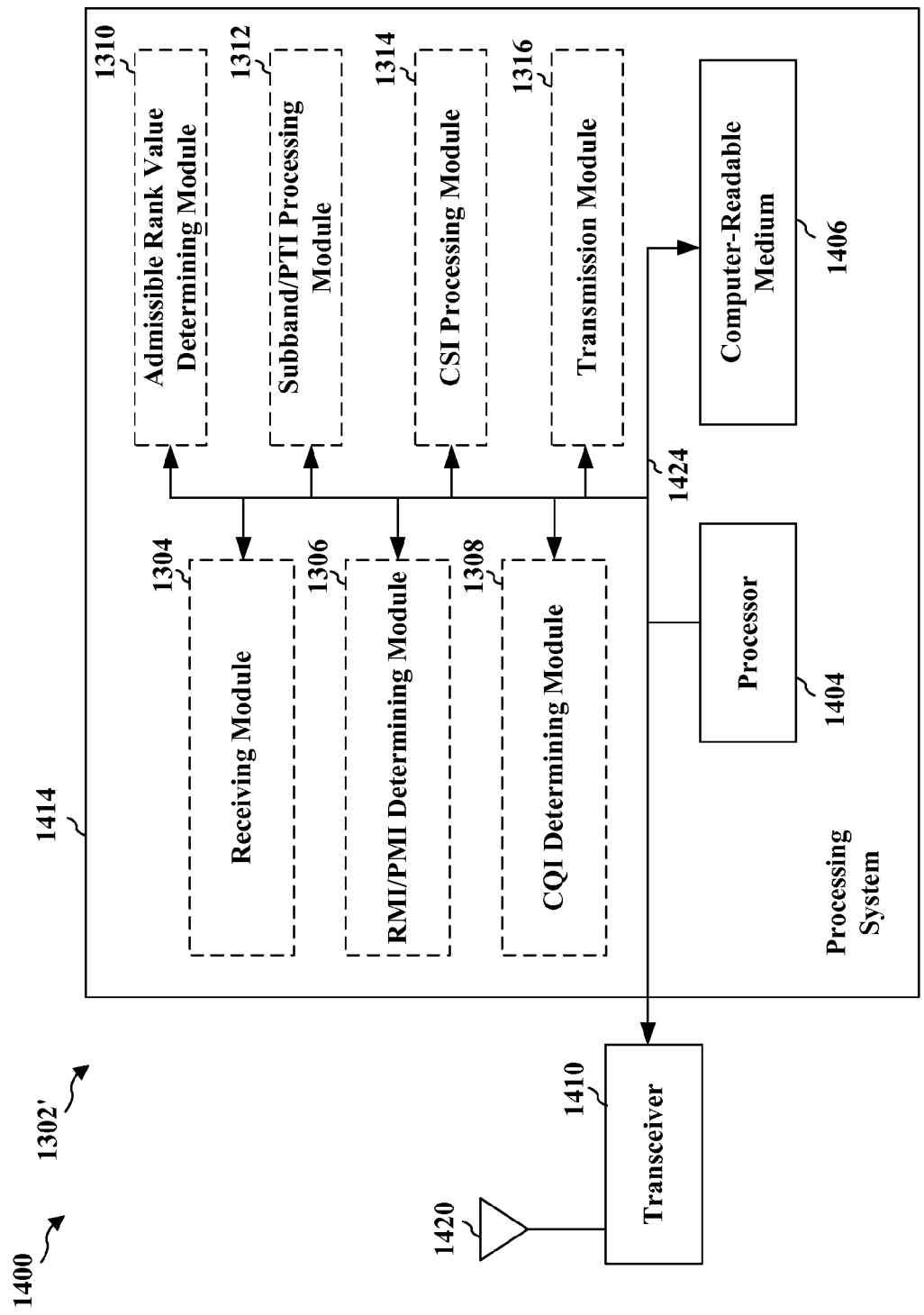
FIG. 14 is a diagram illustrating an example of a hardware implementation for an apparatus employing a processing system.

FIG. 14 is a diagram 1400 illustrating an example of a hardware implementation for an apparatus 1302' employing a processing system 1414. The processing system 1414 may be implemented with a bus architecture, represented generally by the bus 1424. The bus 1424 may include any number of interconnecting buses and bridges depending on the specific application of the processing system 1414 and the overall design constraints. The bus 1424 links together various circuits including one or more processors and/or hardware modules, represented by the processor 1404, the modules 1304, 1306, 1308, 1310, 1312, 1314, 1316, and the computer-readable medium 1406. The bus 1424 may also link various other circuits such as timing sources, peripherals, voltage regulators, and power management circuits, which are well known in the art, and therefore, will not be described any further.

The processing system 1414 may be coupled to a transceiver 1410. The transceiver 1410 is coupled to one or more antennas 1420. The transceiver 1410 provides a means for communicating with various other apparatus over a transmission medium. The transceiver 1410 receives a signal from the one or more antennas 1420, extracts information from the received signal, and provides the extracted information to the processing system 1414, specifically the receiving module 1304. In addition, the transceiver 1410 receives information from the processing system 1414, specifically the transmission module 1316, and based on the received information, generates a signal to be applied to the one or more antennas 1420. The processing system 1414 includes a processor 1404 coupled to a computer-readable medium 1406. The processor 1404 is responsible for general processing, including the execution of software stored on the computer-readable medium 1406. The software, when executed by the processor 1404, causes the processing system 1414 to perform the various functions described supra for any particular apparatus. The computer-readable medium 1406 may also be used for storing data that is manipulated by the processor 1404 when executing software. The processing system further includes at least one of the modules 1304, 1306, 1308, 1310, 1312, 1314, and 1316. The modules may be software modules running in the processor 1404, resident/stored in the computer readable medium 1406, one or more hardware modules coupled to the processor 1404, or some combination thereof. The processing system 1414 may be a component of the UE 650 and may include the memory 660 and/or at least one of the TX processor 668, the RX processor 656, and the controller/processor 659.

In one configuration, the apparatus 1302/1302' for wireless communication includes means for receiving feedback configuration information that associates a plurality of admissible rank value sets to channel state information (CSI) feedback process sets, each admissible rank value set including at least one rank indicator (RI) and precoding matrix indicator (PMI) pair (RI-PMI pair), each CSI feedback process set including at least one CSI feedback process, and each CSI feedback process being based on an admissible rank value set from the plurality of admissible rank value sets, means for determining a selected admissible rank value set based on the plurality of admissible rank value sets, the selecting being based on signaling from a base station, means for determining at least one RI-PMI pair corresponding to the selected admissible rank value set, means for determining at least one channel quality indicator (CQI), each CQI corresponding to one of the at least one RI-PMI pair, means for transmitting a CSI report including the at least one RI-PMI pair and the at least one CQI to the base station, means for receiving feedback configuration signaling that defines at least a first channel state information (CSI) process and a second CSI process, wherein the first CSI process is designated as a reference CSI process for the second CSI process, means for determining at least one of a rank indicator (RI) or a subband selection for the first CSI process based on measurements associated with the first CSI process, means for determining CSI information for the second CSI process based on the RI and/or subband selection determined for the first CSI process, and means for transmitting the CSI information for at least one of the first CSI process or the second CSI process.

The aforementioned means may be one or more of the aforementioned modules of the apparatus 1302 and/or the processing system 1414 of the apparatus 1302' configured to perform the functions recited by the aforementioned means. As described supra, the processing system 1414 may include the TX Processor 668, the RX Processor 656, and the controller/processor 659. As such, in one configuration, the aforementioned means may be the TX Processor 668, the RX Processor 656, and the controller/processor 659 configured to perform the functions recited by the aforementioned means.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication, comprising:
   receiving, by a user equipment, a feedback configuration comprising a plurality of channel station information (CSI) processes, each CSI process of the plurality of CSI processes comprising information indicating a CSI reference signal (CSI-RS) resource of a plurality of CSI-RS resources for channel estimation and a CSI interference measurement (CSI-IM) resource of a plurality of CSI-IM resources for interference estimation, wherein each CSI-RS resource comprises a non-zero power resource and each CSI-IM resource comprises a zero power resource, and wherein the feedback configuration information is associated, through signaling from a base station, with a plurality of admissible rank value sets, where each admissible rank value set comprises at least one rank indictor (RI) and a precoding matrix indicator (PMI) pair (RI-PMI pair) and where at least one RI-PMI pair is to be reported in a CSI report;
   determining, for each CSI process, an admissible rank value set from the plurality of admissible rank value sets based on the signaling from the base station;
   determining, for each CSI process, at least one channel quality indicator (CQI) based on the CSI-RS resource, CSI-IM resource, and RI-PMI pair associated with the CSI process; and
   transmitting a CSI report for each CSI process of the plurality of CSI processes to the base station, the CSI report including one or more CQI of the at least one CQI and including the RI-PMI pair associated with the CSI process.

2. The method of claim 1, wherein the selected admissible rank value set includes a plurality of admissible rank values.

3. The method of claim 1, wherein the selected admissible rank value set is determined based on one or more sets of subframes for which the CSI report is scheduled.

4. The method of claim 1, wherein the feedback configuration information identifies the plurality of admissible rank value sets for which the at least one RI-PMI pair is reported in the CSI report through additional bits in a downlink control information (DCI) format requesting an aperiodic feedback report.

5. The method of claim 1, wherein the receiving the feedback configuration information further comprises:
   receiving a bitmap specifying an admissible rank value set associated to each CSI process, and conditioning each CSI process by the admissible rank value set by determining at least one RI from the admissible rank value set specified in the bitmap.

6. The method of claim 1, wherein an admissible rank value set excludes certain RI-PMI pairs.

7. The method of claim 1, wherein an RI and a PMI of at least one RI-PMI pair associated to each of the CSI processes are determined based on channel measurements on the CSI-RS resource and interference measurements on the CSI-IM resource.

8. The method of claim 7, wherein the feedback configuration information disables one or more PMIs in a codebook for each CSI process.

9. The method of claim 1,
   wherein the PMI is determined with a frequency granularity for at least one CSI process, the frequency granularity being determined based on a rank value selected for the at least one CSI process,
   wherein the feedback configuration information identifies the admissible rank value sets through Radio Resource Control (RRC)-based configuration, and wherein the transmitting the CSI report includes:
  determining a set of subbands from a plurality of subbands,
  providing a first CSI report corresponding to the set of subbands, and
  providing a second CSI report corresponding to the plurality of subbands.

10. The method of claim 1, wherein a PMI of the at least one RI-PMI pair of the determined admissible rank value set corresponds to an optimal overall PMI for a plurality of admissible rank values of the selected admissible rank value set.

11. A method of wireless communication, comprising:
  receiving, by a user equipment, a feedback configuration signaling from a base station, the feedback configuration signaling defining at least a first channel state information (CSI) process and a second CSI process, wherein the first CSI process is designated as a reference CSI process for the second CSI process, and wherein each of the first CSI process and the second CSI process comprise information indicating a CSI reference signal (CSI-RS) resource of a plurality of CSI-RS resources for channel estimation and a CSI interference measurement (CSI-IM) resource of a plurality of CSI-IM resources for interference estimation, wherein each CSI-RS resource comprises a non-zero power resource and each CSI-IM resource comprises a zero power resource, and wherein the feedback configuration information is associated, through signaling from the base station, with a plurality of admissible rank value sets, where each admissible rank value set comprises at least one rank indictor (RI) and a precoding matrix indicator (PMI) pair (RI-PMI pair) and where at least one RI-PMI pair is to be reported in a CSI report;
  determining, by the user equipment, at least an RI or a subband selection for the first CSI process based on measurements associated with the first CSI process;
  determining, by the user equipment, CSI information for the second CSI process based on at least the RI or the subband selection determined for the first CSI process; and
  transmitting the CSI information for at least one of the first CSI process or the second CSI process.

12. The method of claim 11, wherein:
  the CSI information for the second CSI process comprises at least one of the RI, a precoding matrix indicator (PMI), a channel quality indicator (CQI), a subband selection, or a precoding type indicator (PTI).

13. The method of claim 12, wherein:
  the CSI information for the second CSI process is further based on a PTI associated with the first CSI process when the PTI is configured for the first CSI process and when the CSI information for the second CSI process is based on the RI for the first CSI process.

14. The method of claim 13, wherein:
  the PMI and CQI associated with the second CSI process are determined based on the at least the RI or the subband selection associated with the first CSI process; and
  a PMI and CQI feedback timeline, associated with a periodic reporting configuration of the second CSI process, are configured to avoid incompatible conditioning with respect to the at least the RI or the subband selection of the first CSI process.

15. The method of claim 13, wherein:
  the PMI and CQI associated with the second CSI process are determined based on at least a last reported RI or a last reported subband selection of the first CSI process that occurred on or before a start of a reporting cycle of the second CSI process.

16. The method of claim 13, wherein:
  the PMI and CQI associated with the second CSI process are determined based on at least a last reported RI or a last reported subband selection of the second CSI process; and
  the at least the RI or the subband selection of the second CSI process is inherited from at least a last reported RI or a subband selection of the first CSI process.

17. The method of claim 11, wherein:
  the first CSI process and the second CSI process are configured to use aperiodic feedback reporting based on a physical uplink scheduling channel (PUSCH) mode; and
  the second CSI process selects an associated set of preferred subbands to be the same as a set of preferred subbands determined for the first CSI process.

18. An apparatus for wireless communication, comprising:
  means for receiving a feedback configuration comprising a plurality of channel station information (CSI) processes, each CSI process of the plurality of CSI processes comprising information indicating a CSI reference signal (CSI-RS) resource of a plurality of CSI-RS resources for channel estimation and a CSI interference measurement (CSI-IM) resource of a plurality of CSI-IM resources for interference estimation, wherein each CSI-RS resource comprises a non-zero power resource and each CSI-IM resource comprises a zero power resource, and wherein the feedback configuration information is associated, through signaling from a base station, with a plurality of admissible rank value sets, where each admissible rank value set comprises at least one rank indictor (RI) and a precoding matrix indicator (PMI) pair (RI-PMI pair) and where at least one RI-PMI pair is to be reported in a CSI report,
  means for determining, for each CSI process, an admissible rank value set from the plurality of admissible rank value sets based on the signaling from the base station;
  means for determining, for each CSI process, at least one channel quality indicator (CQI)-based on the CSI-RS resource, CSI-IM resource, and RI-PMI pair associated with the CSI process; and
  means for transmitting a CSI report for each CSI process of the plurality of CSI processes to the base station, the CSI report including one or more CQI of the at least one CQI and including the RI-PMI pair associated with the CSI process.

19. The apparatus of claim 18, wherein the selected admissible rank value set includes a plurality of admissible rank values.

20. The apparatus of claim 18, wherein the selected admissible rank value set is determined based on one or more sets of subframes for which the CSI report is scheduled.

21. The apparatus of claim 18, wherein the feedback configuration information identifies the plurality of admissible rank value sets for which the at least one RI-PMI pair is reported in the CSI report through additional bits in a downlink control information (DCI) format requesting an aperiodic feedback report.

22. The apparatus of claim 18, wherein the means for receiving the feedback configuration information is further configured to:
receive a bitmap specifying an admissible rank value set associated to each CSI process, and condition each CSI process by the admissible rank value set by determining at least one RI from the admissible rank value set specified in the bitmap.

23. The apparatus of claim 18, wherein an admissible rank value set excludes certain RI-PMI pairs.

24. The apparatus of claim 18, wherein an RI and a PMI of at least one RI-PMI pair associated to each of the CSI processes are determined based on channel measurements on the CSI-RS resource and interference measurements on the CSI-IM resource.

25. The apparatus of claim 24, wherein the feedback configuration information disables one or more PMIs in a codebook for each CSI process.

26. The apparatus of claim 18,
wherein the PMI is determined with a frequency granularity for at least one CSI process, the frequency granularity being determined based on a rank value selected for the at least one CSI process,
wherein the feedback configuration information identifies the admissible rank value sets through Radio Resource Control (RRC)-based configuration, and
wherein the means for transmitting the CSI report is configured to:
determine a set of subbands from a plurality of subbands,
provide a first CSI report corresponding to the set of subbands, and
provide a second CSI report corresponding to the plurality of subbands.

27. The apparatus of claim 18, wherein a PMI of the at least one RI-PMI pair of the determined admissible rank value set corresponds to an optimal overall PMI for a plurality of admissible rank values of the selected admissible rank value set.

28. A user equipment for wireless communication, comprising:
means for receiving a feedback configuration signaling from a base station, the feedback configuration signaling defining at least a first channel state information (CSI) process and a second CSI process, wherein the first CSI process is designated as a reference CSI process for the second CSI process, and wherein each of the first CSI process and the second CSI process comprise information indicating a CSI reference signal (CSI-RS) resource of a plurality of CSI-RS resources for channel estimation and a CSI interference measurement (CSI-IM) resource of a plurality of CSI-IM resources for interference estimation, wherein each CSI-RS resource comprises a non-zero power resource and each CSI-IM resource comprises a zero power resource, and wherein the feedback configuration information is associated, through signaling from the base station, with a plurality of admissible rank value sets, where each admissible rank value set comprises at least one rank indictor (RI) and a precoding matrix indicator (PMI) pair (RI-PMI pair) and where at least one RI-PMI pair is to be reported in a CSI report;
means for determining at least an RI or a subband selection for the first CSI process based on measurements associated with the first CSI process;
means for determining CSI information for the second CSI process based on the at least the RI or the subband selection determined for the first CSI process; and
means for transmitting the CSI information for at least one of the first CSI process or the second CSI process.

29. The user equipment of claim 28, wherein:
the CSI information for the second CSI process comprises at least one of the RI, a precoding matrix indicator (PMI), a channel quality indicator (CQI), a subband selection, or a precoding type indicator (PTI).

30. The user equipment of claim 29, wherein:
the CSI information for the second CSI process is further based on a PTI associated with the first CSI process when the PTI is configured for the first CSI process and when the CSI information for the second CSI process is based on the RI for the first CSI process.

31. The user equipment of claim 30, wherein:
the PMI and CQI associated with the second CSI process are determined based on the at least the RI or the subband selection associated with the first CSI process; and
a PMI and CQI feedback timeline, associated with a periodic reporting configuration of the second CSI process, are configured to avoid incompatible conditioning with respect to the at least the RI or the subband selection of the first CSI process.

32. The user equipment of claim 30, wherein:
the PMI and CQI associated with the second CSI process are determined based on at least a last reported RI or a last reported subband selection of the first CSI process that occurred on or before a start of a reporting cycle of the second CSI process.

33. The user equipment of claim 30, wherein:
the PMI and CQI associated with the second CSI process are determined based on at least a last reported RI or a last reported subband selection of the second CSI process; and
the at least the RI or the subband selection of the second CSI process is inherited from at least a last reported RI or a subband selection of the first CSI process.

34. The user equipment of claim 28, wherein:
the first CSI process and the second CSI process are configured to use aperiodic feedback reporting based on a physical uplink scheduling channel (PUSCH) mode; and
the second CSI process selects an associated set of preferred subbands to be the same as a set of preferred subbands determined for the first CSI process.

35. An apparatus for wireless communication, comprising:
a memory; and
at least one processing system coupled to the memory and configured to:
receive a feedback configuration information comprising a plurality of channel station information (CSI) processes, each CSI process of the plurality of CSI processes comprising information indicating a CSI reference signal (CSI-RS) resource of a plurality of CSI-RS resources for channel estimation and a CSI interference measurement (CSI-IM) resource of a plurality of CSI-IM resources for interference estimation, wherein each CSI-RS resource comprises a non-zero power resource and each CSI-IM resource comprises a zero power resource, and wherein the feedback configuration information is associated, through signaling from a base station, with a plurality of admissible rank value sets, where each admissible rank value set comprises at least one rank indictor (RI) and a precoding matrix indicator (PMI) pair (RI-PMI pair) and where at least one RI-PMI pair is to be reported in a CSI report;

determine, for each CSI process, an admissible rank value set from the plurality of admissible rank value sets based on the signaling from the base station;

determine, for each CSI process, at least one channel quality indicator (CQI) based on the CSI-RS resource, CSI-IM resource, and RI-PMI pair associated with the CSI process; and transmit a CSI report for each CSI process of the plurality of CSI processes to the base station, the CSI report including one or more CQI of the at least one CQI and RI-PMI pair associated with the CSI process.

36. The apparatus of claim 35, wherein the selected admissible rank value set includes a plurality of admissible rank values.

37. The apparatus of claim 35, wherein the selected admissible rank value set is determined based on one or more sets of subframes for which the CSI report is scheduled.

38. The apparatus of claim 35, wherein the feedback configuration information identifies the plurality of admissible rank value sets for which the at least one RI-PMI pair is reported in the CSI report through additional bits in a downlink control information (DCI) format requesting an aperiodic feedback report.

39. The apparatus of claim 35, wherein the at least one processing system configured to receive the feedback configuration information is further configured to:

receive a bitmap specifying an admissible rank value set associated to each CSI process, and condition each CSI process by the admissible rank value set by determining at least one RI from the admissible rank value set specified in the bitmap.

40. The apparatus of claim 35, wherein an admissible rank value set excludes certain RI-PMI pairs.

41. The apparatus of claim 35, wherein an RI and a PMI of at least one RI-PMI pair associated to each of the CSI processes are determined based on channel measurements on the CSI-RS resource and interference measurements on the CSI-IM resource.

42. The apparatus of claim 41, wherein the feedback configuration information disables one or more PMIs in a codebook for each CSI process.

43. The apparatus of claim 35,
wherein the PMI is determined with a frequency granularity for at least one CSI process, the frequency granularity being determined based on a rank value selected for the at least one CSI process,
wherein the feedback configuration information identifies the admissible rank value sets through Radio Resource Control (RRC)-based configuration, and
wherein the at least one processing system configured to transmit the CSI report is configured to:
determine a set of subbands from a plurality of subbands,
provide a first CSI report corresponding to the set of subbands, and
provide a second CSI report corresponding to the plurality of subbands.

44. The apparatus of claim 35, wherein a PMI of the at least one RI-PMI pair of the determined admissible rank value set corresponds to an optimal overall PMI for a plurality of admissible rank values of the selected admissible rank value set.

45. A user equipment for wireless communication, comprising:

a memory; and at least one processing system coupled to the memory and configured to:

receive a feedback configuration signaling from a base station that defines at least a first channel state information (CSI) process and a second CSI process, wherein the first CSI process is designated as a reference CSI process for the second CSI process, and wherein each of the first CSI process and the second CSI process comprise information indicating a CSI reference signal (CSI-RS) resource of a plurality of CSI-RS resources for channel estimation and a CSI interference measurement (CSI-IM) resource of a plurality of CSI-IM resources for interference estimation, wherein each CSI-RS resource comprises a non-zero power resource and each CSI-IM resource comprises a non-zero power resource, and wherein the feedback configuration information is associated, through signaling from the base station, with a plurality of admissible rank value sets, where each admissible rank value set comprises at least one rank indictor (RI) and a precoding matrix indicator (PMI) pair (RI-PMI pair) and where at least one RI-PMI pair is to be reported in a CSI report;

determine at least an RI or a subband selection for the first CSI process based on measurements associated with the first CSI process;

determine CSI information for the second CSI process based on the at least the RI or the subband selection determined for the first CSI process; and transmit the CSI information for at least one of the first CSI process or the second CSI process.

46. The user equipment of claim 45, wherein:
the CSI information for the second CSI process comprises at least one of the RI, a precoding matrix indicator (PMI), a channel quality indicator (CQI), a subband selection, or a precoding type indicator (PTI).

47. The user equipment of claim 46, wherein:
the CSI information for the second CSI process is further based on a PTI associated with the first CSI process when the PTI is configured for the first CSI process and when the CSI information for the second CSI process is based on the RI for the first CSI process.

48. The user equipment of claim 47, wherein:
the PMI and CQI associated with the second CSI process are determined based on the at least the RI or the subband selection associated with the first CSI process; and
a PMI and CQI feedback timeline, associated with a periodic reporting configuration of the second CSI process, are configured to avoid incompatible conditioning with respect to the at least the RI or the subband selection of the first CSI process.

49. The user equipment of claim 47, wherein:
the PMI and CQI associated with the second CSI process are determined based on at least a last reported RI or a last reported subband selection of the first CSI process that occurred on or before a start of a reporting cycle of the second CSI process.

50. The user equipment of claim 47, wherein:
the PMI and CQI associated with the second CSI process are determined based on at least a last reported RI or a last reported subband selection of the second CSI process; and
the at least the RI or the subband selection of the second CSI process is inherited from at least a last reported RI or a subband selection of the first CSI process.

51. The user equipment of claim 45, wherein:
the first CSI process and the second CSI process are configured to use aperiodic feedback reporting based on a physical uplink scheduling channel (PUSCH) mode; and
the second CSI process selects an associated set of preferred subbands to be the same as a set of preferred subbands determined for the first CSI process.

52. A non-transitory computer-readable medium storing computer executable code for wireless communication, comprising code for:
receiving, by a user equipment, a feedback configuration information comprising a plurality of channel station information (CSI) processes, each CSI process of the plurality of CSI processes comprising information indicating a CSI reference signal (CSI-RS) resource of a plurality of CSI-RS resources for channel estimation and a CSI interference measurement (CSI-IM) resource of a plurality of CSI-IM resources for interference estimation, wherein each CSI-RS resource comprises a non-zero power resource and each CSI-IM resource comprises a zero power resource, and wherein the feedback configuration information is associated, through signaling from a base station, with a plurality of admissible rank value sets, where each admissible rank value set comprises at least one rank indictor (RI) and a precoding matrix indicator (PMI) pair (RI-PMI pair) and where at least one RI-PMI pair is to be reported in a CSI report;
determining, for each CSI process, an admissible rank value set from the plurality of admissible rank value sets based on the signaling from the base station;
determining, for each CSI process, at least one channel quality indicator (CQI based on the CSI-RS resource, CSI-IM resource, and RI-PMI pair associated with the CSI process; and
transmitting a CSI report for each CSI process of the plurality of CSI processes to the base station, the CSI report including one or more CQI of the at least one CQI and including the RI-PMI pair associated with the CSI process.

53. A non-transitory computer-readable medium storing computer executable code for wireless communication, comprising code for:
receiving, by a user equipment, a feedback configuration signaling that defines at least a first channel state information (CSI) process and a second CSI process, wherein the first CSI process is designated as a reference CSI process for the second CSI process, and wherein each of the first CSI process and the second CSI process comprise information indicating a CSI reference signal (CSI-RS) resource of a plurality of CSI-RS resources for channel estimation and a CSI interference measurement (CSI-IM) resource of a plurality of CSI-IM resources for interference estimation, wherein the first CSI process and the second CSI process are defined by a linkage of a separately configured CSI-RS resource and CSI-IM resource, and wherein the feedback configuration information is associated, through signaling from a base station, with a plurality of admissible rank value sets, where each admissible rank value set comprises at least one rank indictor (RI) and a precoding matrix indicator (PMI) pair (RI-PMI pair) and where at least one RI-PMI pair is to be reported in a CSI report;
determining, by the user equipment, at least an RI or a subband selection for the first CSI process based on measurements associated with the first CSI process;
determining, by the user equipment, CSI information for the second CSI process based on the at least the RI or the subband selection determined for the first CSI process; and
transmitting the CSI information for at least one of the first CSI process or the second CSI process.

* * * * *